US010983715B2

(12) United States Patent
Sharoni et al.

(10) Patent No.: US 10,983,715 B2
(45) Date of Patent: Apr. 20, 2021

(54) EXPANDABLE MEMORY FOR USE WITH SOLID STATE SYSTEMS AND DEVICES

(71) Applicant: Western Digital Technologies, Inc., San Jose, CA (US)

(72) Inventors: Liran Sharoni, Hod Hasharon (IL); Amir Shaharabany, Kochav Yair (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 119 days.

(21) Appl. No.: 16/136,174

(22) Filed: Sep. 19, 2018

(65) Prior Publication Data
US 2020/0089420 A1    Mar. 19, 2020

(51) Int. Cl.
*G06F 3/06*      (2006.01)
*G06Q 20/40*    (2012.01)
*G06F 21/10*    (2013.01)

(52) U.S. Cl.
CPC ............ *G06F 3/0637* (2013.01); *G06F 21/10* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 8,307,186 B2 * | 11/2012 | Ando | G06F 3/0605 711/171 |
| 9,983,807 B1 * | 5/2018 | Tylik | G06F 3/0604 |
| 2009/0282212 A1 * | 11/2009 | Peterson | G06Q 30/06 711/173 |
| 2012/0110338 A1 * | 5/2012 | Druschel | G06F 21/6218 713/182 |
| 2013/0282967 A1 * | 10/2013 | Ramanujan | G06F 3/0689 711/103 |
| 2014/0240335 A1 * | 8/2014 | Hu | G06F 12/0253 345/543 |
| 2019/0205054 A1 * | 7/2019 | Fujii | G11C 16/3495 |
| 2019/0258521 A1 * | 8/2019 | Takashige | G06F 9/5016 |

OTHER PUBLICATIONS

NVM Express; "Non-Volatile Memory Express" Revision 1.3a, dated Oct. 24, 2017; 287 pages.

* cited by examiner

*Primary Examiner* — Tracy C Chan
(74) *Attorney, Agent, or Firm* — Loza & Loza, LLP; Gabriel Fitch

(57) ABSTRACT

The present disclosure describes technologies and techniques for use by a data storage controller—such as a controller for use with a NAND or other non-volatile memory (NVM)—to provide a user-expandable memory space. In examples described herein, a customer may choose to purchase access to only a portion of the total available memory space of a consumer device, such as a smartphone. Later, the customer may expand the user-accessible memory space. In one example, the customer submits suitable payment via a communication network to a centralized authorization server, which returns an unlock key. Components within the data storage controller of the consumer device then use the key to unlock additional memory space within the device. In this manner, if the initial amount of memory the consumer paid for becomes full, the consumer may conveniently expand the amount of user-accessible memory.

30 Claims, 18 Drawing Sheets

EXPANDABLE MEMORY FOR USE WITH SOLID STATE SYSTEMS AND DEVICES

FIELD

The subject matter described herein relates to solid state systems and devices. More particularly, the subject matter relates, in some examples, to expandable memories for use with non-volatile memory (NVM) devices or other solid state memory devices.

INTRODUCTION

Solid state device (SSD) data storage systems, such as flash drive data storage systems, often utilize an NVM composed of NAND storage components or arrays (hereinafter "NANDs"). Many such SSDs are installed as embedded components in mobile devices, such as smartphones. To save money or for other reasons, mobile device customers often purchase a relatively inexpensive device with a relatively modest SSD storage capacity. Later, the customer may wish to store larger quantities of data within the device, especially if new applications (apps) have been installed in the device that require the storage of larger amounts of data. Once the memory of the SSD is full, the customer may then need to store the data elsewhere, such as in a cloud-based storage system, which can be inconvenient and costly, or may need to buy a new mobile device with a larger SSD storage capacity, which can also be inconvenient and costly.

It would be desirable to provide solutions that would permit mobile device users, or the users of other devices employing SSDs, to more conveniently and inexpensively expand or otherwise change the amount of storage available to them within the device.

SUMMARY

One embodiment of the present disclosure provides a data storage device, including: an NVM device; a memory access enablement controller configured to enable access to a first amount of memory within the NVM device; an authorization controller configured to authorize access a second amount of memory within the NVM device based on an indication of authorization received from a host device; and a memory access adjustment controller configured to enable access to the second amount of memory in response to the indication of authorization.

Another embodiment of the present disclosure provides a data storage device, including: an NVM device; and a processing circuit configured to enable access to a first amount of memory within the NVM device while restricting access to a second amount of memory, authorize access the second amount of memory within the NVM device based on an indication of authorization received from a host device, and enable access to the second amount of memory in response to the indication of authorization.

Yet another embodiment of the present disclosure provides a system, including: a host device; an authorization server; and a data storage device coupled to the host device, the data storage device including an NVM device, a memory access enablement controller configured to enable access to a first amount of memory within the NVM device, an authorization controller configured to authorize access a second amount of memory within the NVM device based on an indication of authorization received from the authorization server via the host device, and a memory access adjustment controller configured to enable access to the second amount of memory in response to the indication of authorization.

Still another embodiment of the present disclosure provides a method for use by a data storage device having a data storage controller and an NVM device, the method including: enabling access to a first amount of memory within a total amount of memory within the NVM device; receiving an indication that access is permitted to a second amount of memory within the total amount of memory within the NVM device; and enabling access to the second amount of memory within the NVM device in response to the indication.

Yet another embodiment of the present disclosure provides an apparatus for use in a data storage system having an NVM device, the apparatus including: means for enabling access to a first portion of memory within the NVM device, the first portion of memory less than a total available memory of the NVM device; means for receiving an indication of authorization to expand access to include a second portion of memory within the NVM device; and means, operative in response to the indication of authorization, for expanding access to include the second portion of memory within the NVM device.

BRIEF DESCRIPTION OF THE DRAWINGS

The subject matter described herein will now be explained with reference to the accompanying drawings of which.

DETAILED DESCRIPTION

Figure 1:
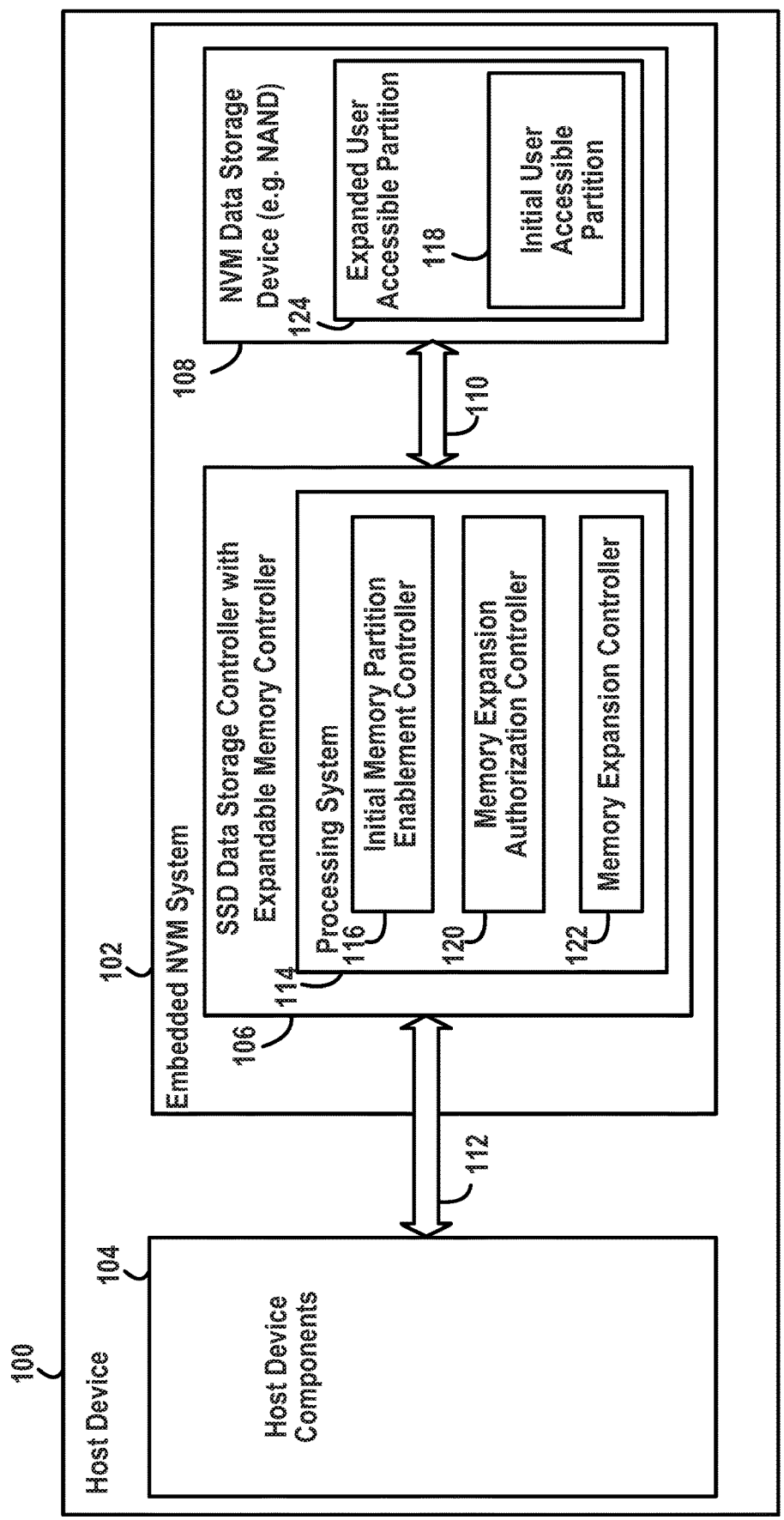
FIG. 1 illustrates a data storage system having a data storage controller and an NVM device, where the data storage controller is configured to provide user expandable memory.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for use by solid state devices (SSDs) such as flash drive data storage systems. The main examples described herein relate to non-removable (i.e. embedded) non-volatile memory (NVM) storage systems configured for use as components of smartphones or the like. However, aspects and features described herein are applicable to other data storage systems and components.

As noted in the Introduction Section above, issues can arise if a customer or user purchases a relatively inexpensive smartphone (or other device) with a relatively modest NVM storage capacity. Once the embedded memory of the device is filled, the user may then need to store additional data elsewhere, such as in a cloud-based storage system, or may need to buy a new device with larger capacity, which can also be inconvenient and costly. Cloud storage also raises issues of security and privacy since data is shared with the third party operating the cloud storage system. Moreover, even if the physical memory of the device can be expanded by adding an additional separate memory (e.g. a second flash drive), the user still might not be able to store large files that would exceed the size of the individual memory components.

These and other issues may be addressed within SSDs (or similar systems or devices) by providing user-expandable memory within the device. Within examples described herein, consumer devices such as smartphones are equipped with a relatively large embedded NVM capacity (e.g. 256 gigabytes GB of physical NAND, which is large by current standards), but to save money the customer may initially purchase access to only a portion of that total available memory (e.g. 128 GB). As such, the user is initially authorized to access only a portion of the available physical memory space. Later, the customer may expand the accessible memory space by purchasing access to more of the physical memory space. This may be accomplished by having the user submit a purchase authorization to a centralized authorization server, which returns an authorization (unlock) key. Components within the data storage controller of the device verify the key and unlock the remaining physical memory space (or whatever amount of additional memory space the user has purchased access to via the expansion procedure). As such, the user need not purchase a new device, or resort to storing excess data in a cloud-based system, but may more conveniently expand the accessible memory space within the device. Moreover, even if the user never purchases the upgrade to the larger memory, benefits may nevertheless be gained because wear leveling can be performed over all physical memory blocks, and so endurance can be enhanced (as compared to a device that is equipped with less physical memory). The values of 128 GB and 256 GB are merely exemplary. The total amount of physical memory might instead be larger (e.g. 512 GB, 1 terabyte (TB), 2 TB, etc.) or smaller (e.g. 128 GB, 64 GB, 32 GB, etc.)

Exemplary Data Storage Controller Embodiments

FIG. 1 illustrates, at a high level, a host device 100, which may be, e.g., a smartphone, tablet computer, videocamera, etc. The host device 100 includes an embedded NVM system 102, which stores data on behalf of other host device components 104, such as videocamera components, software running on a main processor of the host device, etc. The embedded NVM system 102 includes an SSD data storage controller 106 (which may also referred to as a flash controller, memory controller or device controller) configured to control access to an NVM data storage device (such as a NAND) 108. For an NVM write (program) operation, the data storage controller 106 receives data from the host components 104 and stores the data in the NVM device 108. Data and commands may be routed between the data storage controller 106 and the NVM device 108 along a (first) bus 110. Data and commands may be routed between the host components 104 and the data storage controller 106 along a (second) bus 112. These and other operations may be performed under the control of a processor, processing circuit, or processing system 114. Note also that the controller 106 and its components may be configured using any suitable technology and may be, for example, a physical hardware circuit or a logical controller formed of functional modules.

Among many other functions, the data storage controller 106 controls the amount of memory within the NVM 108 that the host components 104 are permitted to access on behalf of the user (or owner or operator) of the device. In the example of FIG. 1, the processing system 114 includes an initial memory partition enablement controller 116, which is configured to permit or enable access to an initial user accessible memory partition 118 of the NVM device 108 based on an amount of memory the user has purchased access to (based, for example, on an initial purchase/lease/rental agreement with a vendor). In one example, the initial partition 118 may be about half of the total available physical memory space of the NVM device. A memory expansion authorization controller 120 is configured to control a subsequent authorization procedure to expand the amount of memory the user is authorized to access. This may involve (a) receiving a request from the user of the host device 100 to initiate the authorization procedure, (b) forwarding the request via host components 104 to an external authorization server (not shown in FIG. 1), which verifies payment by the user, (c) receiving an unlock key or other indication of authorization, and (d) verifying the authenticity of the key.

A memory expansion controller 122 is configured to expand the amount of memory the host device components 104 are permitted to access, in response to receipt of proper authorization, from the initial user accessible partition 118 to an expanded user accessible partition 124. Thereafter, the host device components 104 (such as videocamera components or the like) are permitted to store a greater amount of data. In this manner, the user may conveniently expand the accessible memory of the device without purchasing a new device or resorting to cloud storage. Notably, although the user may be authorized initially to access only, for example, one half of the total memory space of the NVM device 108, the data storage controller 106 may distribute that data over the entire physical memory of the NVM device 108. That is, the initial memory partition 118 and the expanded memory partition 124 may be logical memory partitions that specify an amount of data that can be stored, rather than physical memory partitions that specify where the data is to be stored within the physical NAND storage elements. By employing logical memory partitions, rather than physical memory partitions, wearing leveling and other functions may be applied to the entire NVM physical memory space even if the user is authorized to access only a portion of that total physical memory space.

Figure 2:
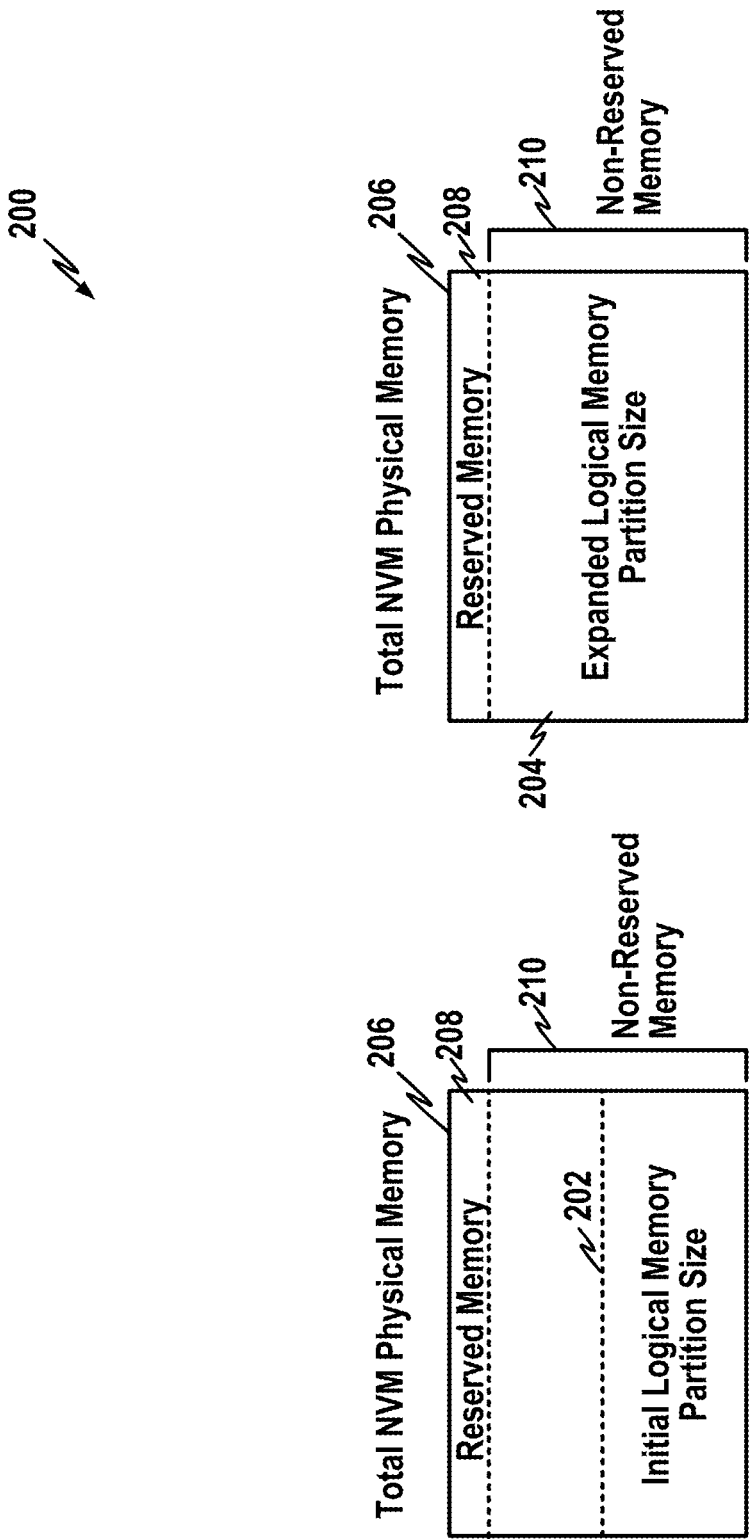
FIG. 2 illustrates an exemplary initial memory partition and an expanded memory partition within a physical memory of an NVM device.

FIG. 2 is a diagram 200 that illustrates an exemplary initial memory partition 202 and an expanded memory partition 204. The figure also illustrates the total NVM physical memory 206. As shown, in this example, the initial memory partition 202 corresponds to about one half of the total physical memory 206, and the expanded memory partition 204 is considerably larger. Even when expanded, the user accessible memory space does not include all of the physical memory space of the NVM, since a portion 208 of the NVM is reserved memory for boot partitions, translation tables, or other non-user system data. Hence, as a practical matter, if the total physical memory space of the NVM device is N GB, the maximum user-accessible portion might be, for example, 90% of that total, i.e. 0.9*N.

Figure 3:
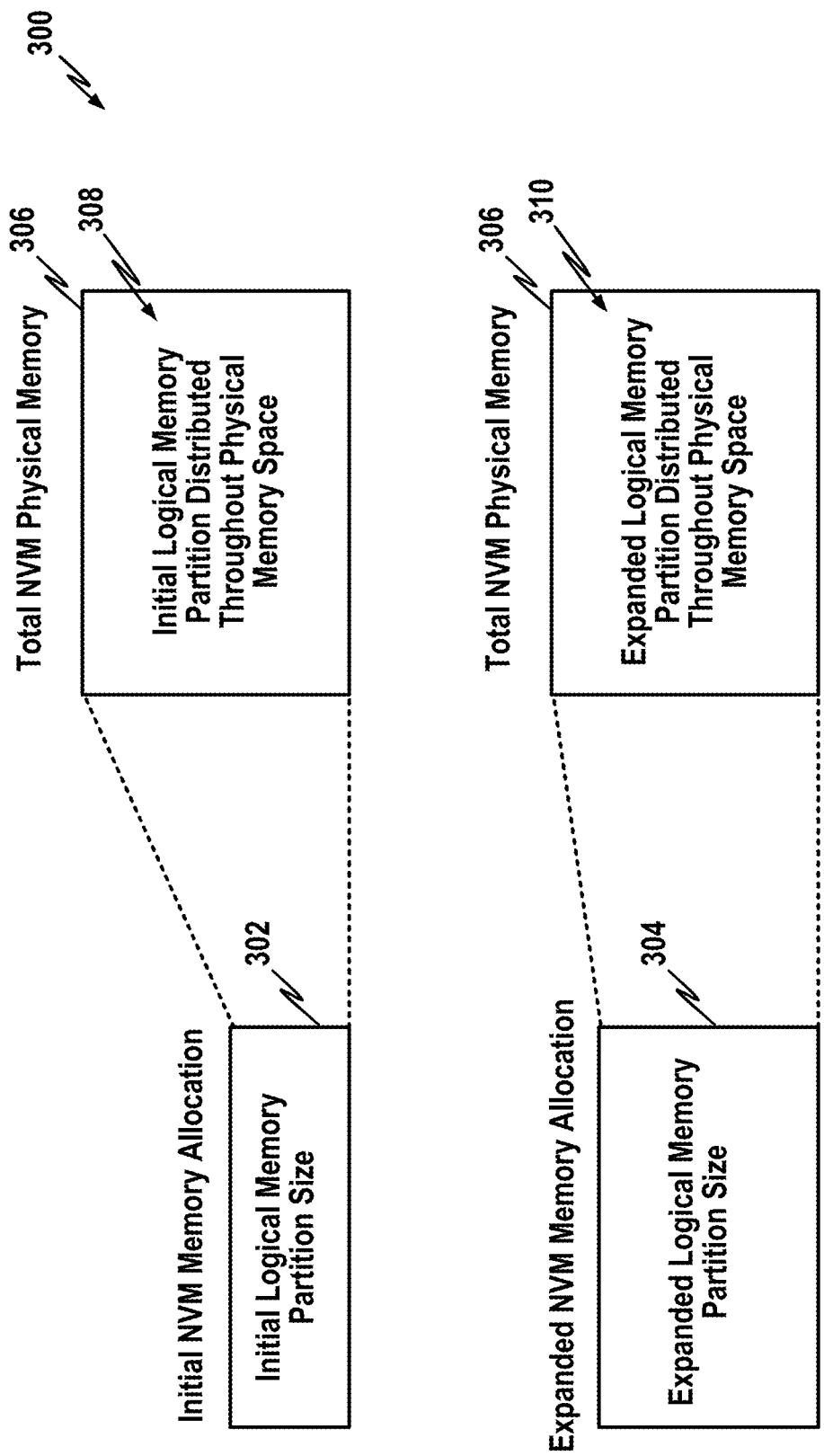
FIG. 3 illustrates that initial and expanded memory partitions may be logical partitions with data is distributed throughout all (or most) of the NVM physical memory.

FIG. 3 is a diagram 300 illustrating that both initial and expanded memory partitions 302 and 304 are logical partitions for which the stored data is distributed throughout all (or most) of the NVM physical memory 306. In the example of FIG. 3, the initial logical memory partition 302 is distributed throughout the physical memory 306 as shown by distributed memory space 308, and the expanded logical memory partition 304 is distributed throughout physical memory as shown by distributed memory space 310. Wearing leveling, garbage collection, and other NVM management functions may be applied to the entire the NVM physical memory space 306 even if only the initial logical partition 302 is enabled for the user.

Figure 4:
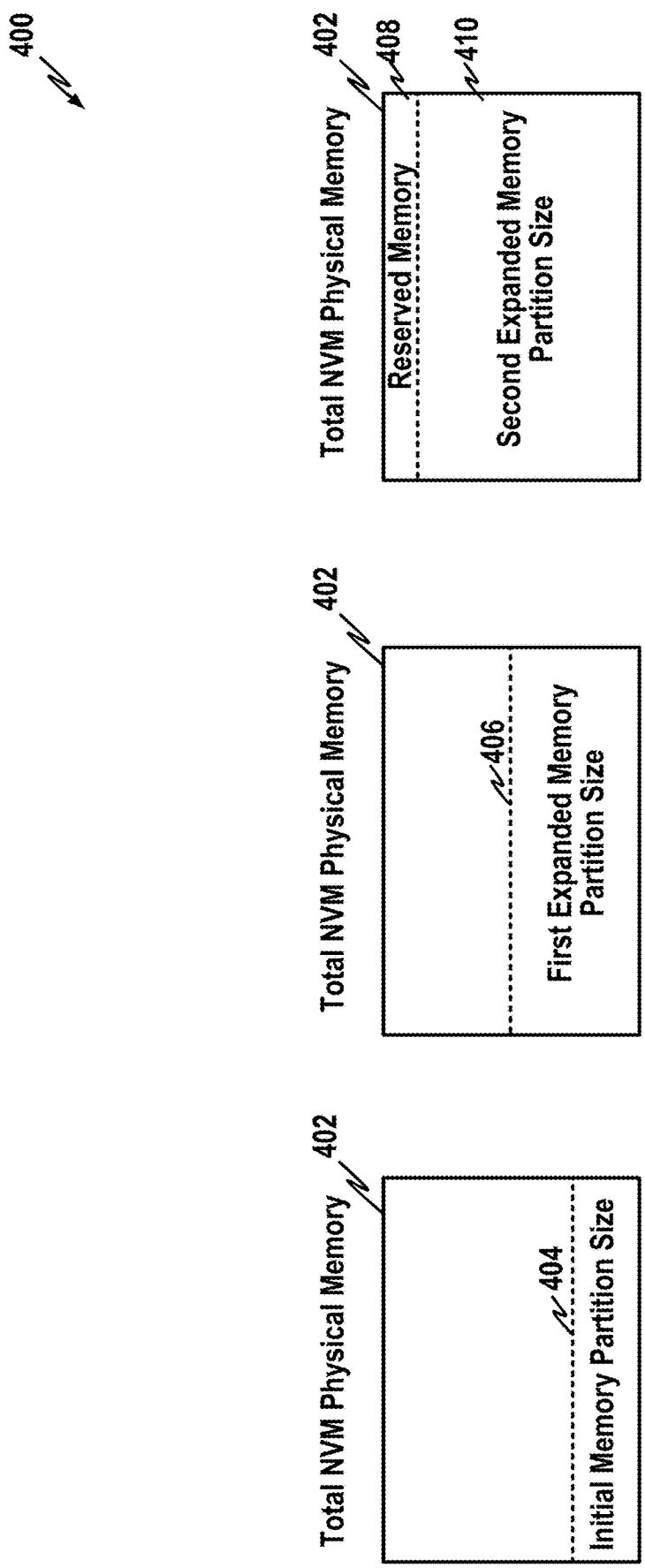
FIG. 4 illustrates that multiple sizes of expandable memory partitions may be employed within an NVM physical memory space.

FIG. 4 is a diagram 400 illustrating that multiple sizes of expandable memory partitions may be employed within an NVM physical memory space 402. In the example of FIG. 4, an initial memory partition has size 404 (which may correspond to, e.g., about one quarter of the total available memory space), a first expanded memory partition has size 406 (which may correspond to, e.g., about one half of the total available memory space), and a second expanded memory partition has size 406 (which may correspond to, e.g., the remaining total available memory space, less an amount 408 used for system data, etc.) Hence, although it is often sufficient to accommodate just two user-configurable partition sizes (initial/small and expanded/large), other subdivisions of memory partitions may be exploited to permit greater user choice, and the various memory partitions may be of generally varying sizes.

Figure 5:
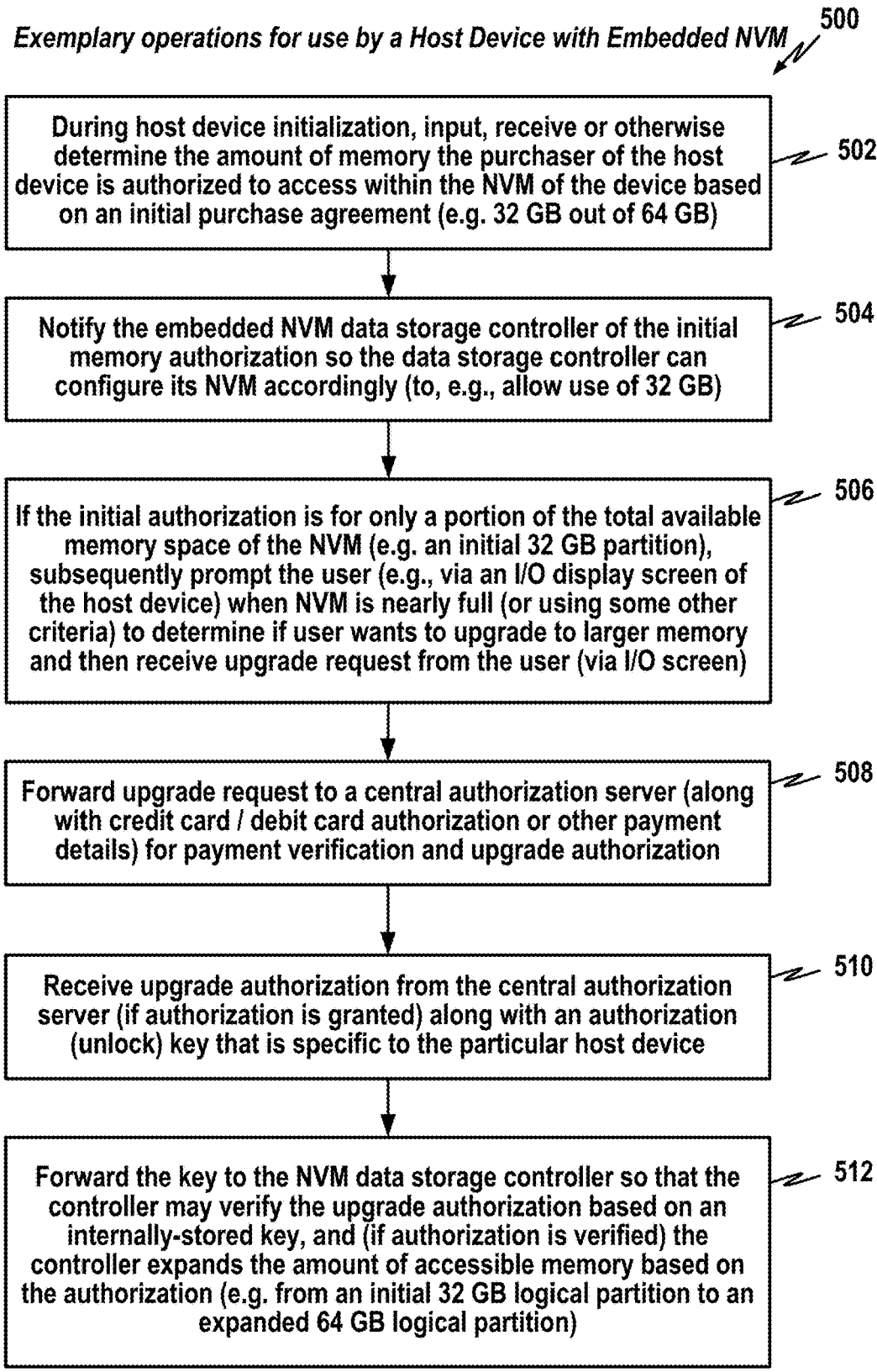
FIG. 5 is a flow diagram summarizing exemplary operations performed by a host device to implement a memory expansion procedure with an embedded NVM system.

FIG. 5 illustrates exemplary operations 500 performed by a host device (such as a smartphone) that includes an embedded NVM system to implement a memory expansion procedure. At 502, during host device initialization (e.g., at beginning of life (BOL)), the host device inputs (or receives an indication of or otherwise determines) the amount of memory the purchaser (or customer or user) of the device is authorized to access within the NVM of the host device based on, for example, an initial purchase agreement (e.g. 32 GB out of 64 GB). At 504, the host device notifies its embedded NVM data storage controller of the initial memory authorization so the data storage controller can configure its components accordingly (to, e.g., allow use of 32 GB out of the 64 GB). As already explained, the data storage controller may define a logical memory partition with a size set equal to the initial authorized memory allotment. Once the data storage controller configures its components to the initial authorized size, a portion of logical block addresses (LBAs) accessible by the host are then locked by the data storage controller so the LBAs are invisible to, and cannot be used by, the host device.

At 506, if the initial authorization is for only a portion of the total available memory space of the NVM (e.g. an initial 32 GB partition), the host device subsequently prompts the user (e.g. via an input/output I/O display screen of the host device) when the embedded NVM is nearly full (or using some other criteria) to determine if the user wants to upgrade to larger memory, and then receiving an upgrade request from the user (via the I/O screen). In one particular example, the NVM is deemed "nearly full" if the user has used 90% or more of the initial logical memory partition. As can be appreciated, many criteria may be used to trigger the user notification. The determination of whether the NVM is nearly full may be made by the data storage controller or, in some examples, by host software.

At 508, the host device forwards the upgrade request to a central authorization server (along with a credit card/debit card authorization or other payment details) for payment verification and upgrade authorization. At 510, the host device receives the upgrade authorization from the central authorization server (assuming that authorization is granted) along with an authorization (unlock) key that is specific to the particular host device. At 512, the host device forwards the key to the data storage controller so that the controller may verify the upgrade authorization based on an internally-stored copy of the key to verify that the unlock key is authentic and is not an attempt to "jailbreak" or "hack" the device to expand the memory without proper payment. Such keys may be managed and maintained by the authorization server and uploaded to the End-User host device upon initial purchase of the device for storage in the NVM system. In some examples, the host device and the authorization server perform a key exchange while the host device is still in the factory to set up the unlock key that is bound to the unique device ID. The unlock key and the unique ID are then burned into the ROM. In other examples, the key exchange might be performed later. Preferably, at least some key components or IDs are stored in hardware to provide top tier protection from hacks.

Examples of device IDs and corresponding unlock keys are shown in Table I:

TABLE I

| ID | Key |
|---|---|
| SN023875203875 | c8ed26c3b72e4709de2c7b6c8e7022b6e92edb2a |
| SN023875203876 | 0909ebd8a02d4644d66811755ba488a126b31bf7 |

Assuming authorization is verified at 512, the controller expands the amount of accessible memory based on the authorization (e.g. from an initial 32 GB logical partition to an expanded 64 GB logical partition). In some examples, the unlock key serves to unlock a wider range of LBAs to allow user access to more memory space (so that the additionally LBAs are no longer transparent to the host device). Once the data storage controller has expanded the LBA range, the host may respond by mounting and/or expanding any partitions it maintains.

Figure 6:
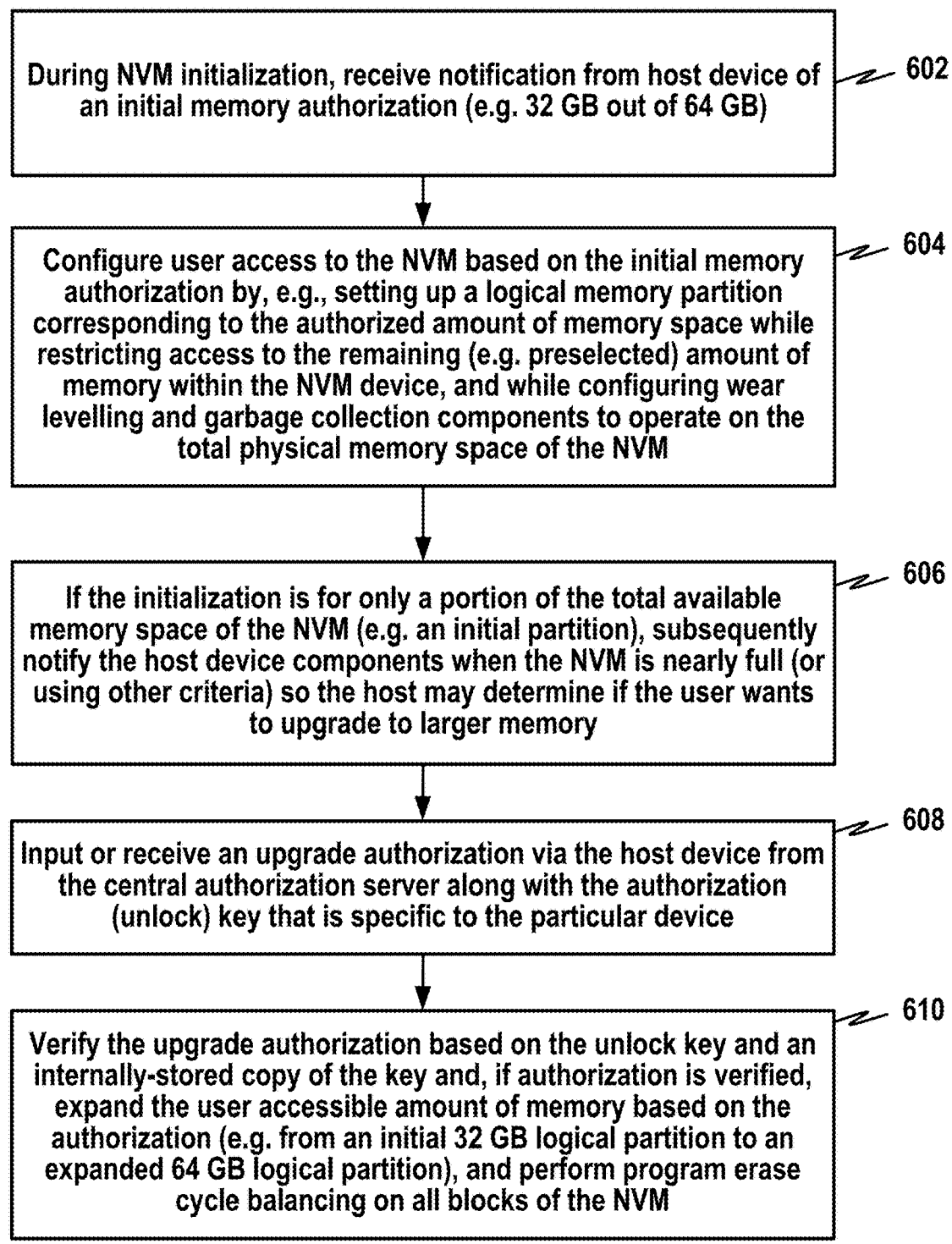
FIG. 6 is a flow diagram summarizing exemplary operations performed by an NVM data storage device embedded in a host device to implement a memory expansion procedure.

FIG. 6 illustrates exemplary operations 600 performed by an NVM data storage device embedded within a host device to implement the memory expansion procedure. At 602, during NVM initialization, the data storage controller receives a notification from the host device of the initial memory authorization (e.g. 32 GB out of 64 GB). At 604, the data storage controller configures user access to its NVM based on the initial memory authorization by, e.g., setting up a logical memory partition corresponding to the authorized amount of memory space while restricting access to the remaining (e.g. preselected) amount of memory within the NVM device, while configuring wear leveling and garbage collection components to operate on the total physical memory space of the NVM. At 606, if the initialization is for only a portion of the total available memory space of the NVM (e.g. an initial partition), the data storage controller subsequently notifies the host device components when the NVM is nearly full (or based on some other criteria) so the host device may determine if the user wants to upgrade to larger memory. As discussed above, the host device then sends an upgrade request to a central authorization server and receives an authorization (unlock) key specific to the particular device (assuming the memory expansion is indeed authorized). At 608, the data storage controller receives or inputs the upgrade authorization via the host device from the central authorization server along with the authorization (unlock) key that is specific to the particular host device. At 610, the data storage controller verifies the upgrade authorization based on the unlock key and the internally-stored copy of the key by comparing the unlock key with the internal copy of the key (or using other appropriate key verification techniques). If authorization is verified, the data storage controller at 610 expands the user accessible amount of memory based on the authorization (e.g. from an initial 32 GB logical partition to an expanded 64 GB logical partition). At 610, data storage controller may also perform program erase cycle (PEC) balancing on all blocks of the NVM when the user accessible memory is expanded.

Figure 7:
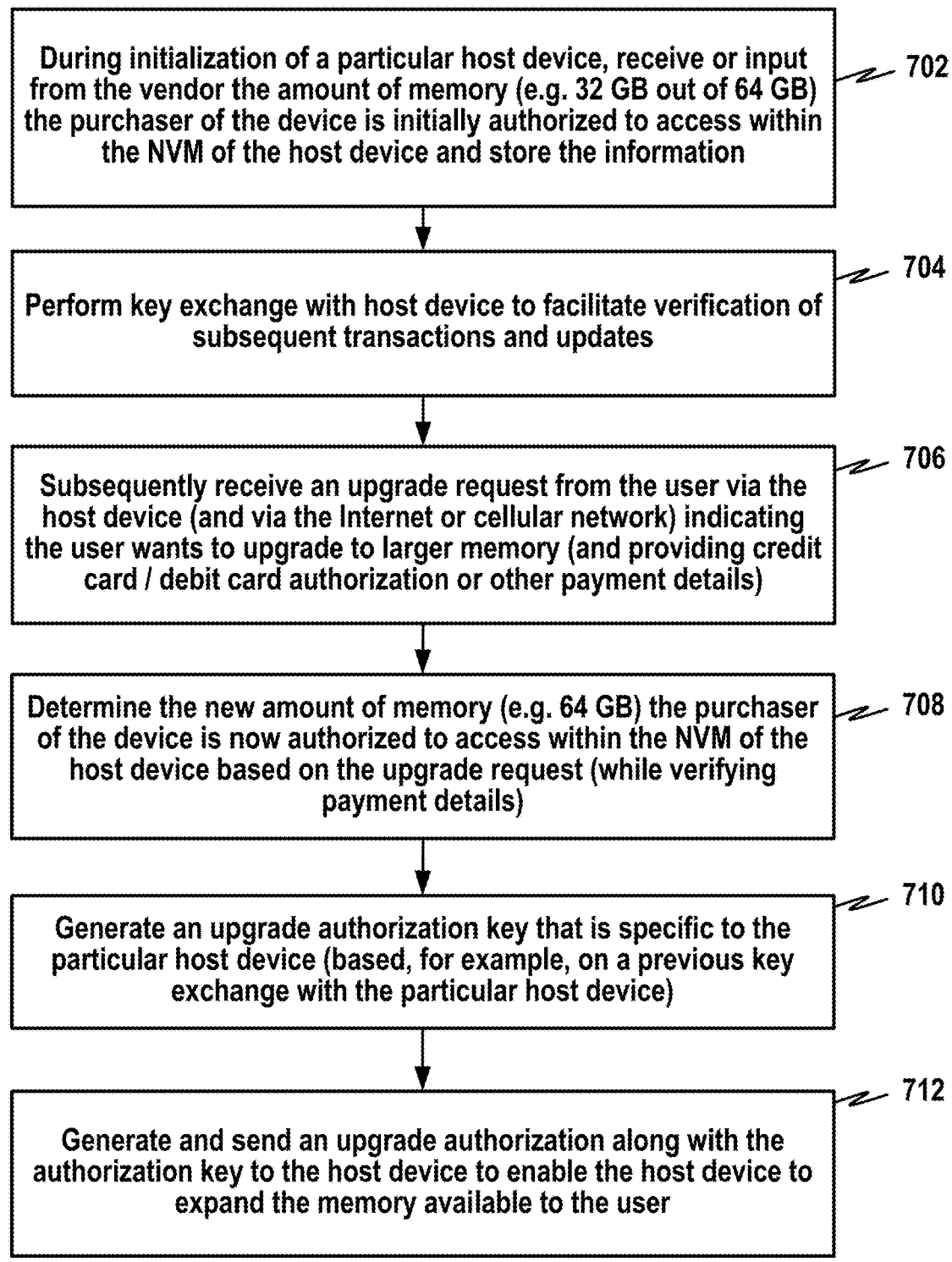
FIG. 7 is a flow diagram summarizing exemplary operations performed by an authorization server to implement a memory expansion procedure.

FIG. 7 illustrates exemplary operations 700 performed by an authorization server to implement the memory expansion procedure. At 702, during initialization of a particular host device (such as a particular smartphone), the authorization server receives or inputs from the vendor the amount of memory (e.g. 32 GB out of 64 GB) the purchaser of the host device is initially authorized to access within the NVM of the host device. For example, during an in-store purchase of a smartphone, the computing systems and/or servers of the vendor notify the authorization server of the initial user memory allotment (e.g. 128 GB) so the authorization server can record that information for subsequent use. At 704, the authorization server may perform an initial key exchange with the host device to set up keys to facilitate verification of subsequent transactions and upgrades. (As noted, the initial key exchange may be performed while the host device is still in the factory so that keys and/or IDs can be burned into ROM.) At 706, the authorization server subsequently receives an upgrade request from the user via the host device (and via the Internet or cellular network) indicating the user wants to upgrade to larger memory (and providing credit card/debit card authorization or other payment details). At 708, the authorization server determines the new amount of memory (e.g. 64 GB) the purchaser of the device is now authorized to access within the NVM of the host device based on the upgrade request (while verifying payment details). At 710, the authorization server generates an upgrade authorization (unlock) key that is specific to the particular host device (based, for example, on a previous key exchange with the particular host device). At 712, the authorization server generates and sends an upgrade authorization along with the authorization key to the host device to enable the host device to expand the memory available to the user.

Figure 8:
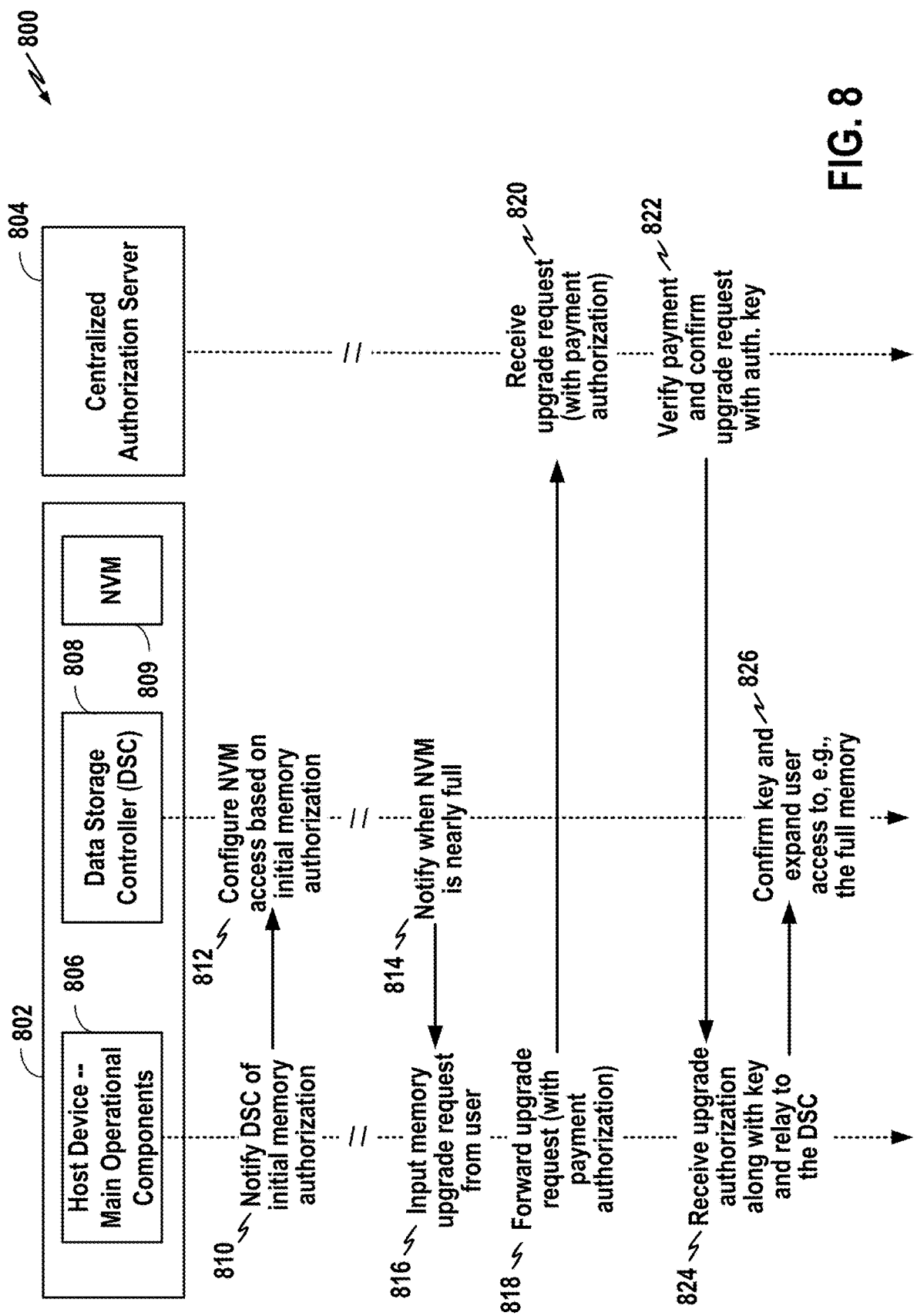
FIG. 8 is a timing diagram summarizing an exemplary sequence of operations performed by components of a system that includes a host device and an authorization server.

FIG. 8 provides a timing diagram 800 illustrating an exemplary sequence of operations performed by components of an overall system that includes a host device 802 and a centralized authorization server 804. The host device 802 includes main operational components 806 (such as core processors, wireless transceivers, videocameras, etc.) and a data storage controller (DSC), which controls access to an NVM 809 such as a set of NANDs. In the example of FIG. 8, the host device 802 has already determined the initial user memory allotment and performed any needed key exchanges with the centralized authorization server 804. At 810, the host operational components 806 notify the data storage controller 808 of the initial memory authorization (i.e. the initial user-accessible memory allotment). At 812, the data storage controller 808 configures access to the NVM 809 based on the initial memory authorization. The host device may operate using the initial user memory allotment for months or years before the NVM 809 becomes nearly full.

Eventually, at 814, the data storage controller notifies the host device components 806 when the NVM 809 is nearly full. At 816, the host device components 806 notify the user and receive or input a memory upgrade request from the user (if the user wishes to pay for the memory expansion). At 818, the host device components 806 forward the upgrade request (with payment authorization) to the centralized authorization server 804, which receives the upgrade request, at 820, with payment authorization. At 822, centralized authorization server 804 verifies payment and confirms the upgrade request with an authorization (unlock) key. At 824, the host components 806 receive the upgrade authorization along with the key and relay the authorization and the key to the data storage controller 808, which, at 826, confirms the key and expands user access to, e.g., the full memory of the NVM 809.

Figure 9:
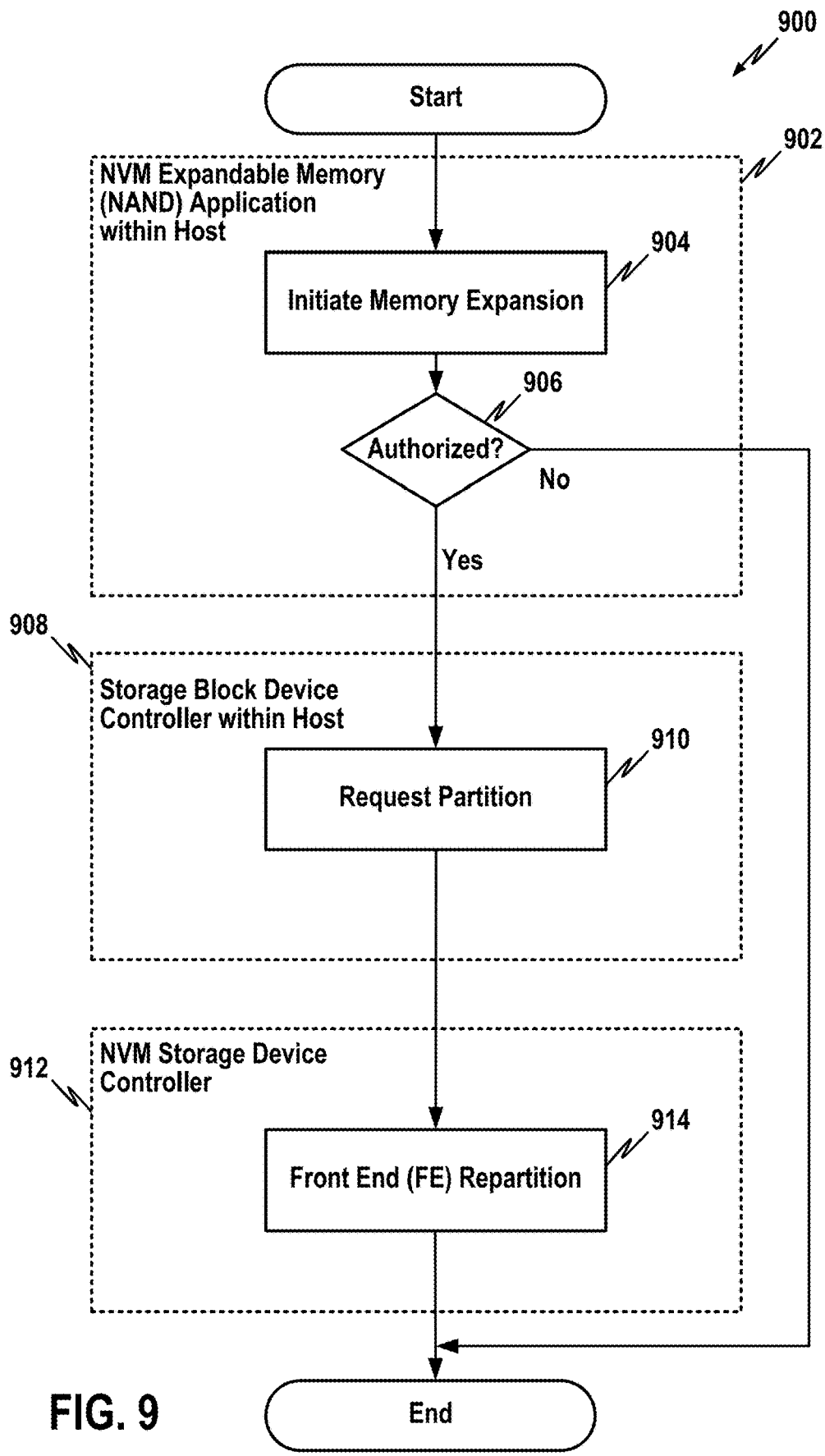
FIG. 9 illustrates additional or alternative exemplary operations performed by a host device that includes an embedded NVM device.

FIG. 9 illustrates additional or alternative exemplary operations 900 performed by a host device that includes an embedded NVM storage system. Within FIG. 9, components that perform the various operations are shown in dashed blocks. Initially, an expandable NVM (NAND) application (or app) 902 within the host device (i.e. a software application running within the host device) initiates a memory expansion operation or procedure at 904. This may involve notifying the user (via the app) that the initial memory allocation is becoming full, forwarding a memory upgrade request to a central server, and receiving authorization in the form of an unlock key. If, at 906, the procedure is not authorized (e.g. because the user did not request the memory upgrade or the upgrade request is denied by the central server), then memory expansion is not performed and the procedure ends.

However, if the expansion is authorized, then a "block device" controller 908 within the host device sends a partition request, at 910, to its embedded NVM storage device controller 912 that specifies the new (expanded) memory size. (Herein, "block device controller" refers to those components within the host device that interact with the NVM system as a block storage device, i.e. a storage device where the details of the particular memory components are transparent to the host. Many embedded NVMs are configured for use as block devices so the designers of host devices need not concern themselves with the details of the particular storage technology. An example of such a NVM block device is the iNAND device provided by SanDisk (where iNAND is a trademark of SanDisk LLC.) At 914, front end (FE) components of the device controller 912 perform a repartitioning of the NVM to allow access to the new (expanded) memory size. Since repartitioning is handled by the FE, back end (BE) components need not be affected. That is, the repartitioning is transparent to components of the device controller that perform wear leveling, garbage collection, etc. As already explained, such operations may be performed over the entire physical memory of the NVM, even if the user is authorized to use only a portion of the memory, thus providing better overall endurance. Terrabytes written (TBM) over the lifetime of the device can be increased.

Figure 10:
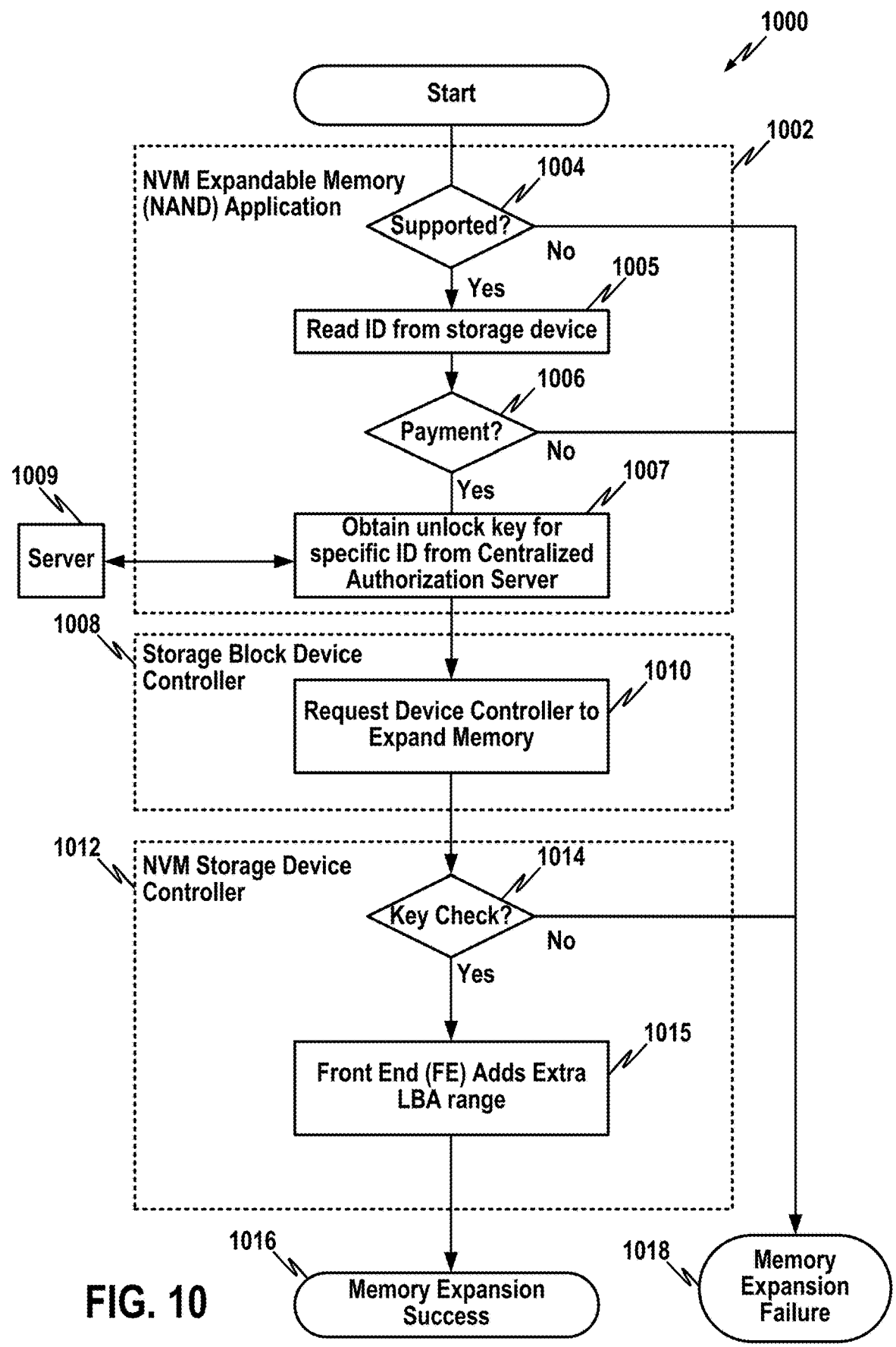
FIG. 10 further illustrates additional or alternative exemplary operations performed by a host device that includes an embedded NVM device.

FIG. 10 illustrates still further exemplary operations 1000 performed by a host device that includes an embedded NVM. Within FIG. 10, components that perform the various operations are again shown in dashed blocks. FIG. 10 assumes that a memory expansion procedure has already been initiated by an expandable NVM (NAND) app 1002. At 1004, the app checks to verify that the memory expansion is supported by the embedded NVM device. If supported, then, at 1005, the app reads a device-specific ID from the NVM storage device (which may be stored in ROM within the device during manufacture to uniquely identify the particular device). At 1006, the app checks to verify that payment is provided by the user (which, in some examples, can involve sending payment details to a central server, such as server 1009). If payment is verified, then, at 1007, the app obtains an unlock key from the server 1009 (which can be compared to a stored version of the key, where the received unlock key and the stored version of the key are unique to the storage device ID).

The block device controller 1008 requests, at 1010, the NVM device controller 1012 to expand the memory (which, as discussed above, may involve sending a partitioning request to the controller that specifies the new larger partition size). At 1014, a key check is performed using the unlock key obtained from the server and the storage device ID to make sure that the unlock key is legitimate (and is not an attempt to "jailbreak" or "hack" the device). If the key check indicates that the expansion authorization is valid, the FE components of the device controller 1012 add an extra LBA range to thereby achieve a repartitioning of the NVM to allow user access to the new (expanded) memory size. Once the LBA range is extended, the memory expansion is a success, as indicated at 1016, and a suitable success notification can be provided to the user by, e.g., the NVM (NAND) app 1002. If any of the decision blocks yield a "no," e.g. payment is not made or the key check fails, the memory expansion thus fails, as indicated at 1018, and a suitable failure warning 1018 is provided to the user by the app 1002.

Exemplary NVM System

Figure 11:
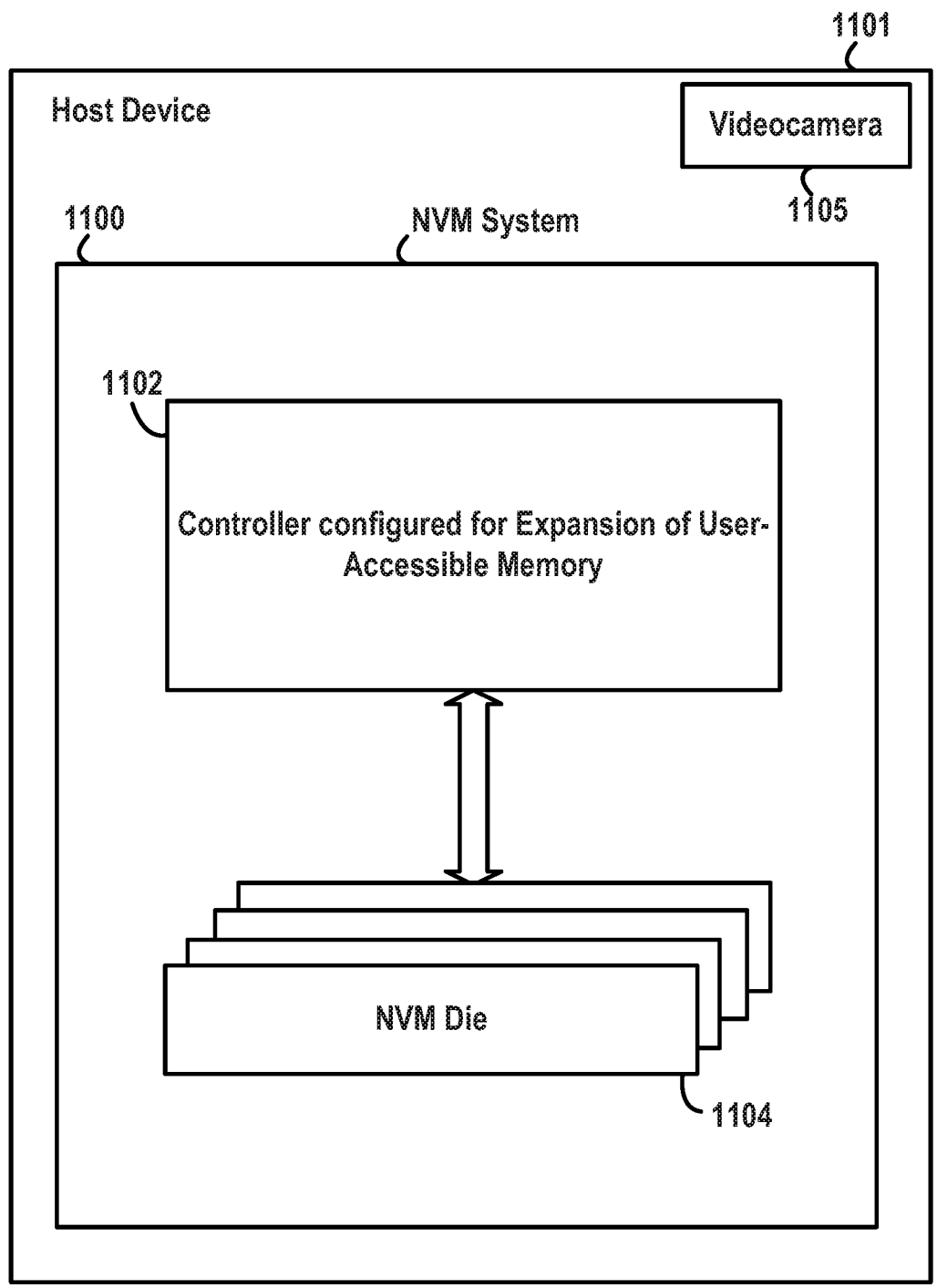
FIG. 11 is a block diagram of an example NVM system having a controller configured for the expansion of user-accessible memory.
Figure 12:
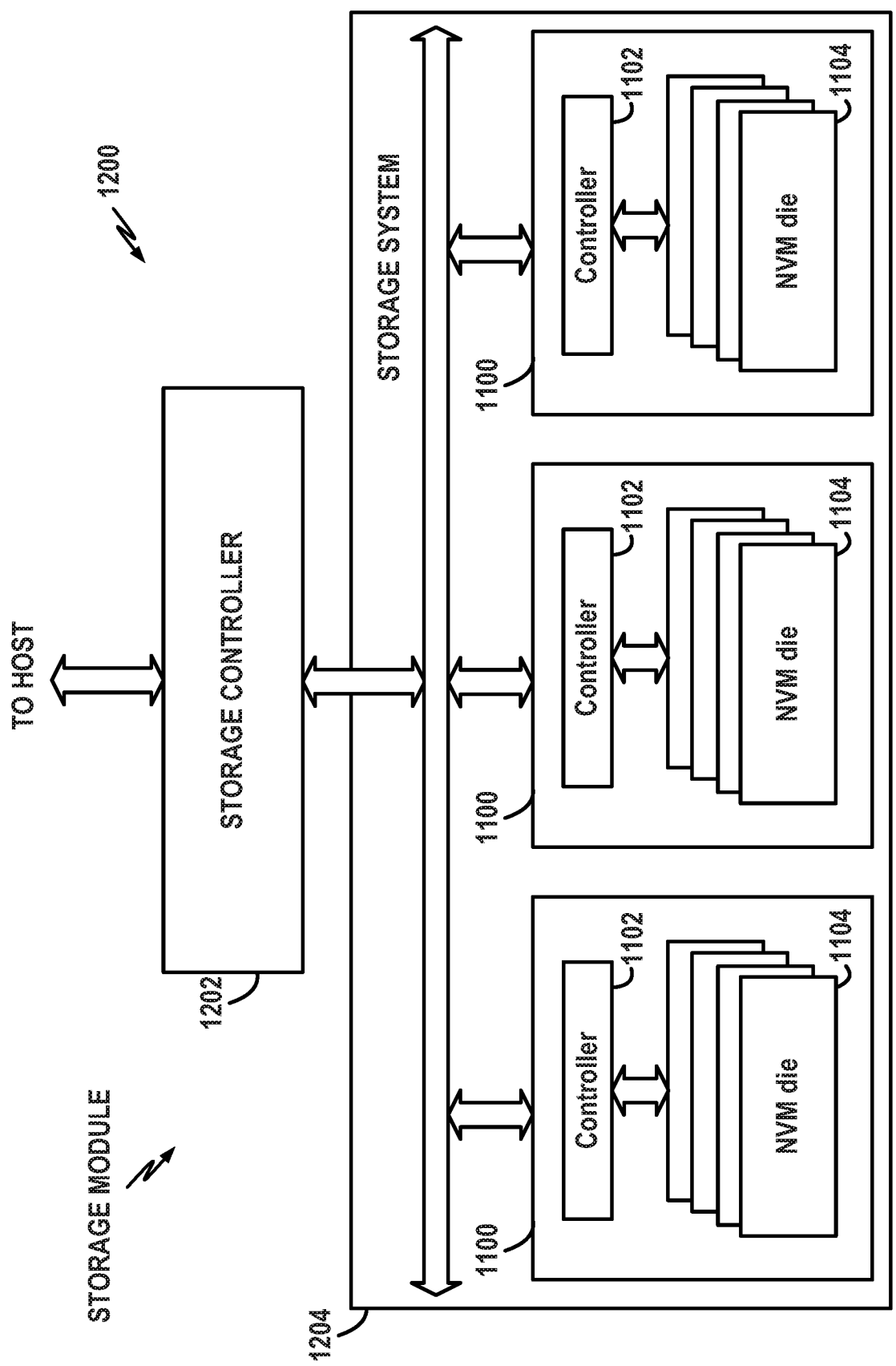
FIG. 12 is a block diagram illustrating an exemplary storage module with multiple NVM systems each having a controller equipped for memory expansion, as in FIG. 11.
Figure 13:
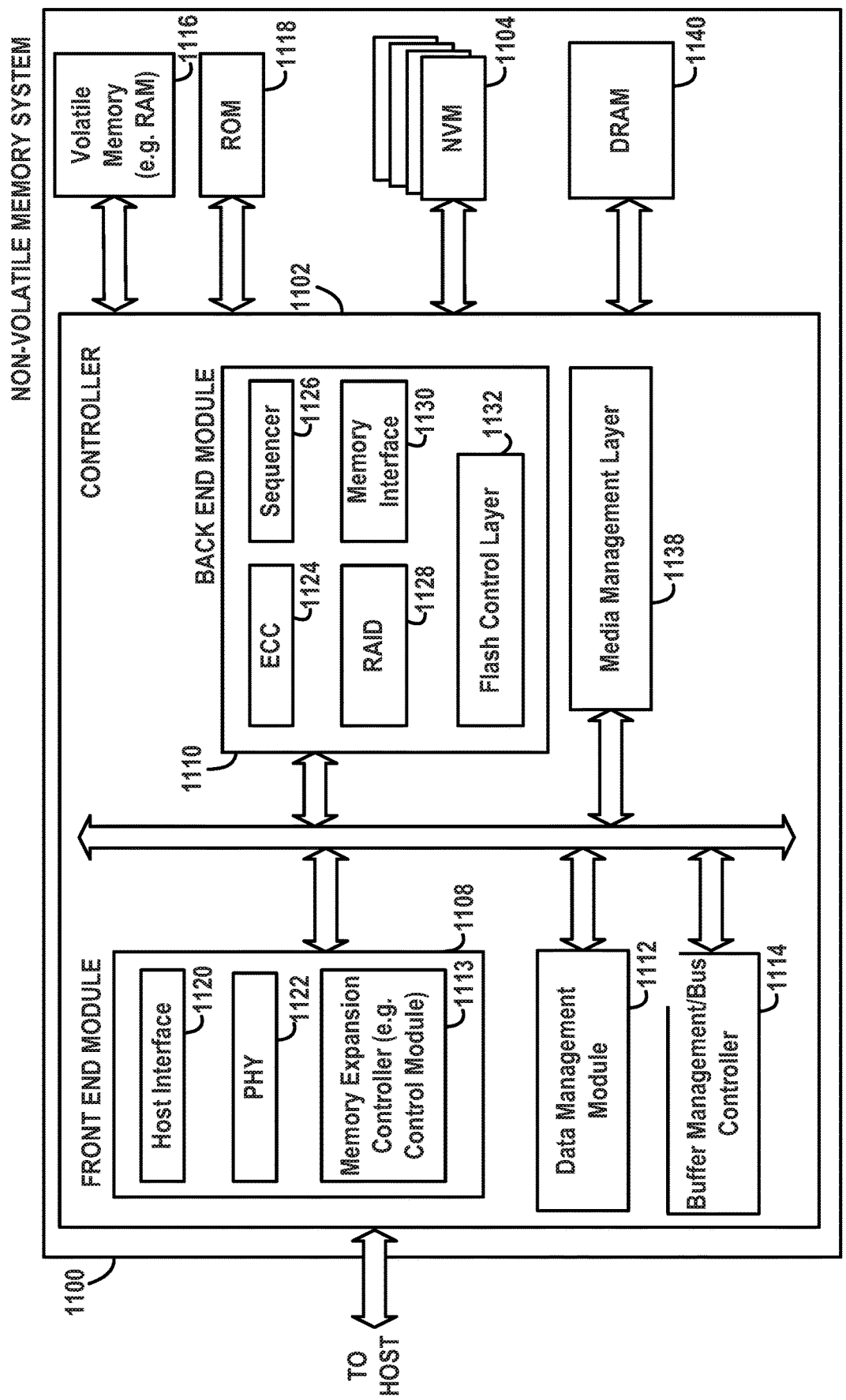
FIG. 13 is a block diagram illustrating exemplary components of the controller of the NVM system of FIG. 11, including a memory expansion module.

FIGS. 11-13 illustrate and summarize various selected features of an exemplary embedded NVM system configured for memory expansion.

FIG. 11 is a block diagram illustrating an exemplary NVM system 1100 embedded within a host device 1101, where the NVM system 1100 is configured to implement one or more of the various systems and methods disclosed herein. The NVM system 1100 includes a controller 1102 configured for the expansion of user-accessible memory, and one or more NVM dies 1104. As used herein, the term die may refer to the set of NVM cells, and the associated circuitry for managing the physical operation of the NVM cells, that are formed on a single semiconductor substrate. Controller 1102 interfaces with other components of the host device 1101 and transmits command sequences for read, write (program), and erase operations to one or more of the NVM dies 1104 to, for example, store video and audio data obtained by a videocamera component 1105 of the host device.

The controller 1102 (which may be a flash memory controller) can take the form of processing circuitry, a microprocessor or processor, and/or a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 1102 can be configured with hardware and/or firmware to perform the various functions described herein and shown in the flow diagrams. Also, some of the components shown herein as being internal to the controller can also be stored external to the controller, and other components can be used. Additionally, the phrase "operatively in communication with" can mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have functionality in addition to the specific functionality described herein. For example, the flash memory controller can format the flash memory to ensure the memory is operating properly, map bad flash memory cells, and allocate spare cells to be substituted for future failed cells. Some portion of the spare cells can be used to hold firmware to operate the flash memory controller and implement other features. In operation, when a host needs to read data from or write data to the flash memory, it communicates with the flash memory controller. If the host provides a logical address to which data is to be read/written, the flash memory controller converts the logical address received from the host to a physical address in the flash memory. The flash memory controller can also perform various memory management functions, such as wear leveling (i.e. distributing writes to avoid wearing out specific blocks of memory that would otherwise be repeatedly written to) and garbage collection (i.e. after a block is full, moving only valid pages of data to a new block, so the full block can be erased and reused).

An NVM die 1104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion (as will be discussed further below).

The interface between controller 1102 and NVM die 1104 may be any suitable flash interface, such as a suitable toggle mode. In the primary embodiments described herein, memory system 1100 is an embedded memory system. In alternative embodiments, memory system 1100 might be a card-based system, such as a secure digital (SD) or a micro secure digital (micro-SD) card. Although, in the example illustrated in FIG. 11, NVM system 1100 includes a single channel between controller 1102 and NVM die 1104, the subject matter described herein is not limited to having a single memory channel. For example, in some NAND memory system architectures, two, four, eight or more NAND channels couple the controller and the NVM memory device, depending on controller capabilities. In any of the embodiments described herein, more than a single channel may be used between the controller and the memory die, even if a single channel is shown in the drawings. The controller 1102 may be implemented in a single integrated circuit chip and may communicate with different layers of memory in the NVM die 1104 over one or more command channels.

FIG. 12 illustrates a storage module 1200 that includes plural NVM systems 1100. As such, storage module 1200 may include a main storage controller 1202 that interfaces with a host and with a storage system 1204, which includes a plurality of NVM systems 1100. The interface between storage controller 1202 and NVM systems 1100 may be a bus interface, such as a serial advanced technology attachment (SATA) or peripheral component interface express (PCIe) interface. Storage module 1200, in one embodiment, may be an SSD, such as flash drives found in portable computing devices, such as laptop computers, and tablet computers.

FIG. 13 is a block diagram illustrating exemplary components of controller 1102 of FIG. 11 in more detail. Controller 1102 includes a front end (FE) module 1108 that interfaces with a host, a back end module 1110 that interfaces with the one or more NVM die 1104, and various other modules that perform functions which will be described below. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 1102 may include a data management module 1112 that handles the scheduling of maintenance and host write operations to balance the consumption of space with the creation of free space. In embodiments having a NVM with a plurality of NVM dies, each NVM die may be operated asynchronously and independently such that multiple NVM die may concurrently have schedule cycles balancing consumption and creation of free space in each respective NVM die. A memory expansion controller (e.g. control module) 1113 of the FE module 1108 is provided to perform or control the above-described memory expansion-related operations, such as by initially configuring LBAs to correspond to only a portion (e.g. half) of the physically-available memory space of the NVM die 1104 and then expanding the LBA range to correspond to the full memory space to thereby permit the user to access the full memory.

A buffer manager/bus controller 1114 manages buffers in volatile memory such as in a random access memory (RAM) 1116 and controls the internal bus arbitration of controller 1102. A read only memory (ROM) 1118 stores system boot code and stores the unique device ID discussed above. A dynamic RAM (DRAM) 1140 may also be provided. Although illustrated in FIG. 13 as located separate from the controller 1102, in other embodiments, the volatile memory 1116, the ROM 1118, and/or the DRAM 1140 may be located within the controller. In yet other embodiments, portions of these components may be located both within the controller 1102 and outside the controller 1102. Further, in some implementations, the controller 1102 and the various memory components may be located on separate semiconductor die.

FE module 1108 also includes a host interface 1120 and a physical layer interface (PHY) 1122 that provide the electrical interface with the host or next level storage controller. The choice of the type of host interface 1120 can depend on the type of memory being used. Examples of host interfaces 1120 include, but are not limited to, SATA, SATA Express, SAS, Fibre Channel, USB, PCIe, and NVMe. See, for example, NVM Express standard, Revision 1.3a, Oct. 24, 2017. However, aspects described herein are applicable to other data storage systems or protocols. The host interface 1120 typically facilitates transfer for data, control signals, and timing signals. Note that, although the memory expansion control module 1113 is shown as part of the front end module 1108 in FIG. 13, the memory expansion control module 1113 (or portions thereof) might be separate from the front end module 1108. In examples where the system uses NVMe, the memory may be managed using namespaces, where a namespace is a quantity of non-volatile memory that may be formatted into logical blocks. With NVMe, the controller may support multiple namespaces that are referenced using a namespace ID. Namespaces may be created and deleted using certain NVMe commands (e.g. Namespace Management and Namespace Attachment commands).

Back end module 1110 includes an error correction controller (ECC) engine 1124 that encodes the data bytes received from the host, and decodes and error corrects the data bytes read from the NVM. A low level command sequencer 1126 generates command sequences, such as program and erase command sequences, to be transmitted to NVM die 1104. A RAID (Redundant Array of Independent Drives) module 1128 manages generation of RAID parity and recovery of failed data. The RAID parity may be used as an additional level of integrity protection for the data being written into the NVM die 1104. In some cases, the RAID module 1128 may be a part of the ECC engine 1124. A memory interface 1130 provides the command sequences to NVM die 1104 and receives status information from NVM die 1104. In one embodiment, memory interface 1130 may be a double data rate (DDR) interface. A flash control layer 1132 controls the overall operation of back end module 1110.

Additional components of system 1100 illustrated in FIG. 13 include media management layer 1138, which performs wear leveling of memory cells of NVM die 1104. As already explained, wear levelling may be performed over the entire physical memory space and not just over the portion for which the user has purchased access. System 1100 may also include other discrete components, not specifically shown, such as external electrical interfaces, external RAM, resistors, capacitors, or other components that may interface with controller 1102. In alternative embodiments, one or more of the physical layer interface 1122, RAID module 1128, media management layer 1138, and buffer management/bus controller 1114 are not necessarily provided in the controller 1102.

These systems and procedures are particularly useful within embedded removable data storage devices equipped for NVMe, but aspects of the systems and procedures might be exploited in removable NVMe storage devices as well, and in devices that do not use NVMe.

Further Exemplary Methods and Embodiments

FIGS. 14-18 illustrate and summarize various general features of exemplary data storage controllers and methods, or procedures for use with data storage controllers.

Figure 14:
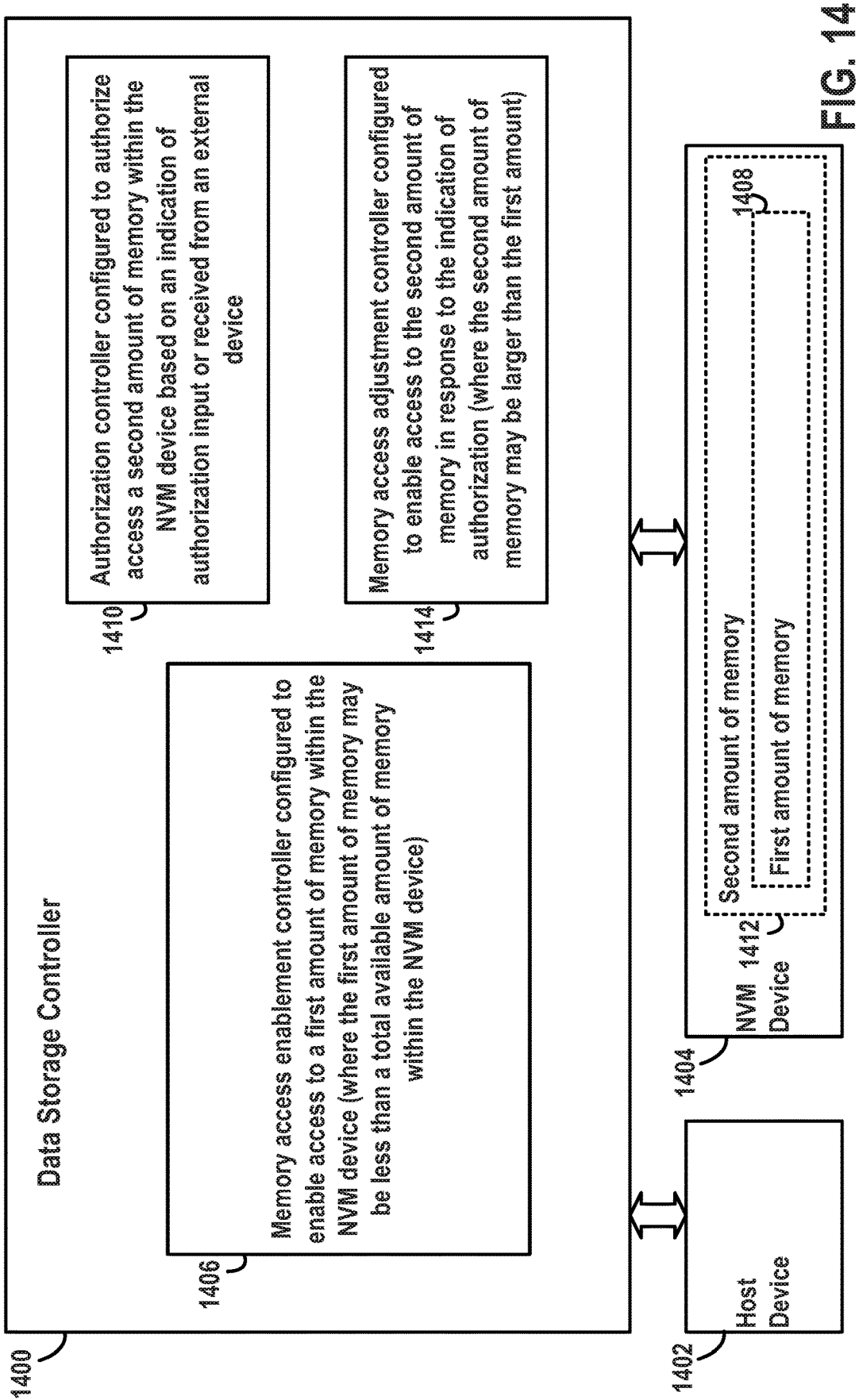
FIG. 14 is a block diagram summarizing selected features of a data storage system having a data storage controller.

FIG. 14 shows an exemplary data storage controller 1400 (or memory controller or device controller) for use with a host device 1402 and a NVM device 1404 such as a NAND. The data storage controller 1400 and the NVM device 1404 may be embedded within the host device 1402 and communicate with other components of the host device 1402 via one or more communication busses. Although some examples described herein relate to PCIe-NVMe controllers for storing data within NAND devices, the NVM device 1504 may be any suitable NVM storage device and is not limited to NANDs, and the data storage controller 1500 may be any suitable memory controller device and is not limited to PCIe-NVMe-based controllers.

The data storage controller 1400 of FIG. 14 includes a memory access enablement controller 1406 configured to enable access (e.g. user or host access) to a first amount of memory 1408 within the NVM device 1404 (where the first amount of memory may be less than a total available amount of memory within the NVM device and where the user may be, for example, the user of a host device in which the data storage controller 1400 and the NVM device 1404 are embedded). Although many of the examples herein involve enabling user access to a larger amount for memory, in some examples a host device may seek to expand the amount of memory it can access without any direction or authorization from the user. Hence, the memory access enablement controller 1406 is not limited to enabling user access but may enable other types of access as well. The data storage controller 1400 also includes an authorization controller 1410 configured to authorize access a second amount of memory 1412 within the NVM device 1404 based on an indication of authorization received or input from the external device 1402. Still further, the data storage controller 1400 includes a memory access adjustment controller 1414 configured to enable access (e.g. user access) to the second amount of memory 1412 in response to the indication of authorization (where the second amount of memory may be larger than the first amount).

As shown in FIG. 14, the second amount of memory 1412 may be larger than the first amount of memory 1408 and may include the first amount of memory 1408 as a portion or sub-set thereof. In some examples, the second amount of memory 1412 encompasses all of the non-reserved memory of the NVM device 1404, whereas the first amount of memory 1408 encompasses half of the non-reserved memory. In other examples, the second amount of memory may be smaller than the first amount of memory. For example, a user might lease a smartphone at a certain monthly rate while initially paying for access to all of the non-reserved memory of the NVM. Thereafter, the user might choose to renew the lease at a lower monthly rate by paying for access only to half of the non-reserved memory (particularly if the user rarely uses more than half of the memory). In such a scenario, the memory access adjustment controller 1414 operates, upon authorization, to reduce the amount of memory that the user can access.

Figure 15:
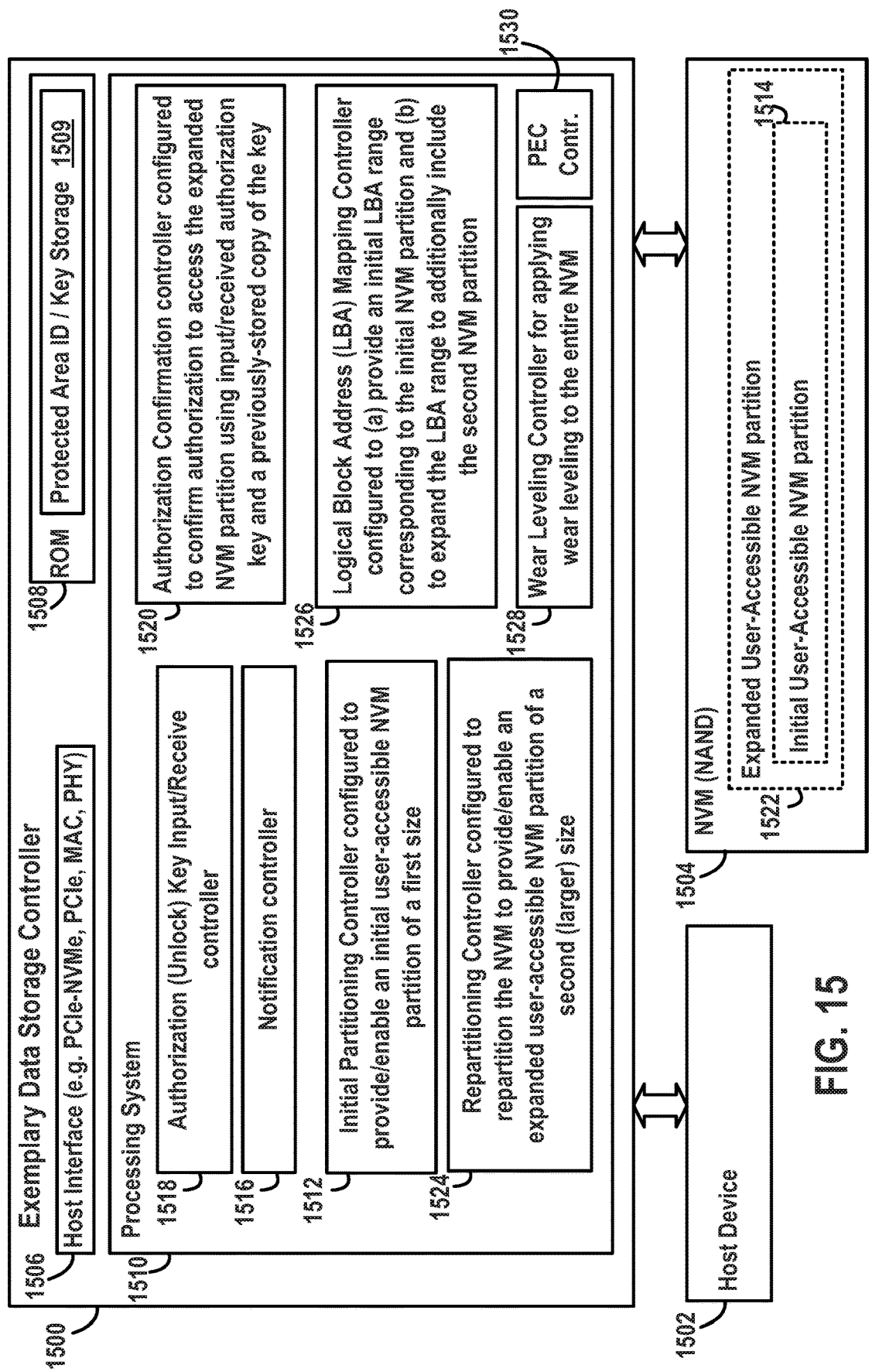
FIG. 15 is another block diagram summarizing further selected features of a data storage system having a data storage controller.

FIG. 15 shows another exemplary data storage controller 1500 configured for use with a host device 1502 and an NVM (NAND) device 1404. The data storage controller 1500 includes a host interface 1506 (such as a PCIe-NVMe, PCIe, MAC, or PHY interface) and a ROM 1508, which may be configured to include a protected area 1509 with ID storage, where the ID is a unique to the particular device. The data storage controller 1500 also includes a processing system 1510 having, among other components, an initial partitioning controller 1512 configured to provide, define or request an initial user-accessible NVM (NAND) partition 1514 of a first size within the NVM 1504. As discussed above, an initial user-accessible partition may correspond to half of the non-reserved memory of the NVM. The processing system 1510 also includes a notification controller 1516 configured to notify the host device 1502 when the initial NVM partition 1514 is nearly (or completely full) so that authorization can be requested from a user of the host device 1502 to expand the user-accessible memory.

An authorization (unlock) key input/receive controller 1518 receives or inputs an authorization key from an external authorization server (not shown in FIG. 15) via the host device 1502 and via the host interface 1506 (if the user requested authorization and the request is granted). An authorization confirmation controller 1520 is configured to confirm authorization to access an expanded user-accessible NVM partition 1522 using the input or received authorization key and a previously-stored confirmation copy of the key (which are unique to a device-specific ID key stored in a protected area 1509 of ROM 1508). The device-specific ID key may be stored in ROM during device manufacture and assembly. In some examples, the confirmation copy of the key may also be stored in ROM. In other examples, the stored copy of the key may be stored in a protected area of the NVM after the initial key exchange is completed at BOL.

A repartitioning controller 1524 is configured to provide, define or request that the NVM 1504 be repartitioned to encompass or correspond to the expanded user-accessible NVM partition 1522 of a second (larger) size. As discussed above, the expanded user-accessible partition may correspond to all of the non-reserved memory of the NVM. To facilitate memory access operations, the processing system 1510 may also include an LBA mapping controller 1526 configured to (a) provide an initial LBA range corresponding to the initial NVM partition and (b) to expand the LBA range to additionally include the second NVM partition (once authorization to expand the memory is confirmed). A wear leveling controller 1528 may be provided for applying wear-leveling to the entire NVM (to, for example, improve NVM lifetime even if the user never requests memory expansion). A program erase cycle (PEC) controller 1530 may be provided for PEC balancing all memory blocks when user access is expanded to the larger second partition.

Figure 16:
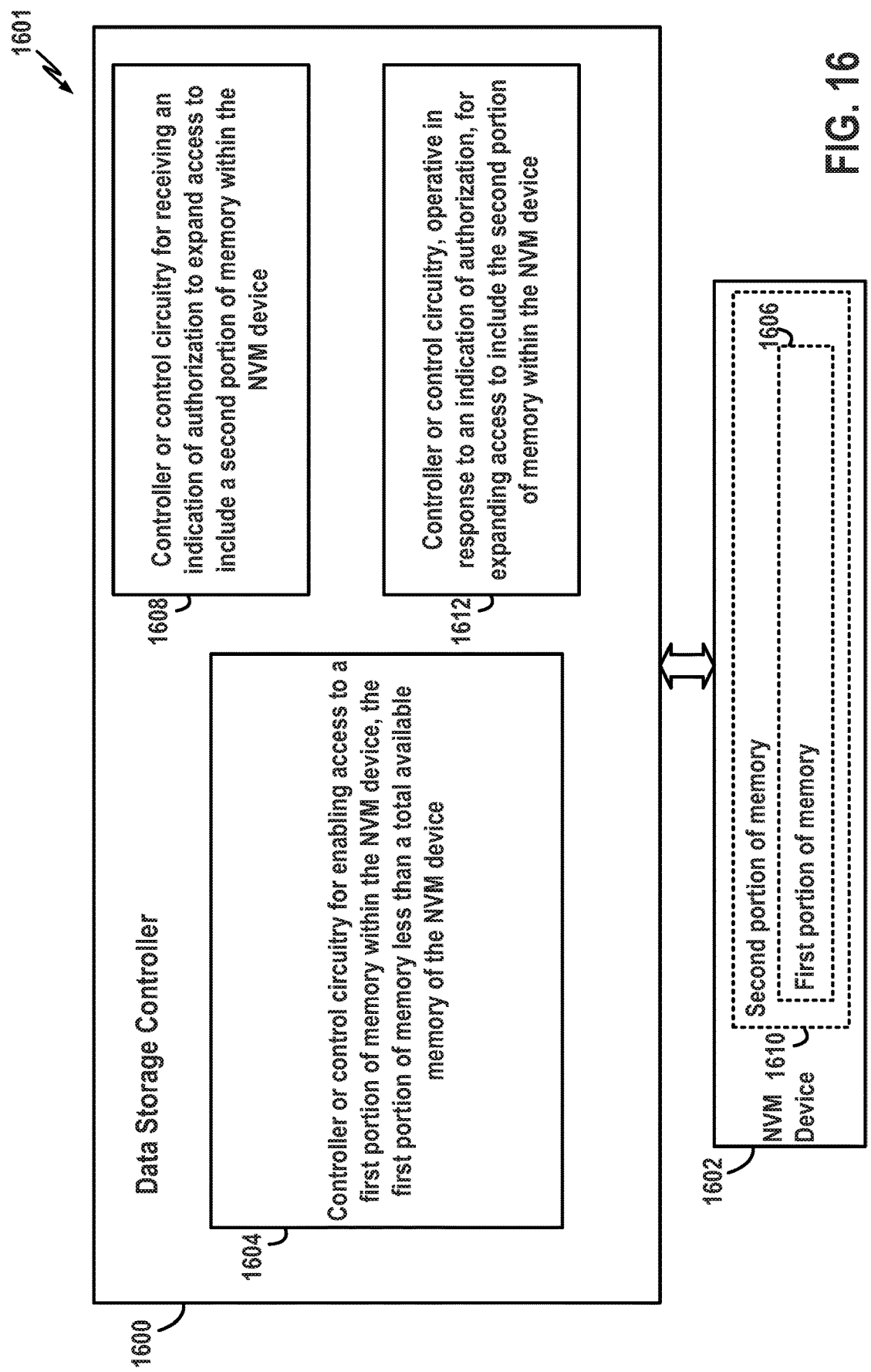
FIG. 16 is a block diagram summarizing selected features of an apparatus.

FIG. 16 shows yet another exemplary data storage controller 1600 for use within a data storage system 1601 that also includes an NVM device 1602. The data storage controller 1600 and the NVM device 1602 may be embedded within (or otherwise coupled to) a host device (not shown in FIG. 16). In the example of FIG. 16, the data storage controller 1600 includes a controller (or control circuitry) 1604 for enabling access to a first portion 1606 of memory within the NVM device 1602, the first portion of memory being less than a total available memory of the NVM device 1602. A controller (or control circuitry) 1608 is also provided for receiving an indication of authorization to expand access to include a second portion 1610 of memory within the NVM device 1602. A controller (or control circuitry) 1612 is also provided that is operative, in response to the indication of authorization, for expanding access to include the second portion 1619 of memory within the NVM device 1602.

Figure 17:
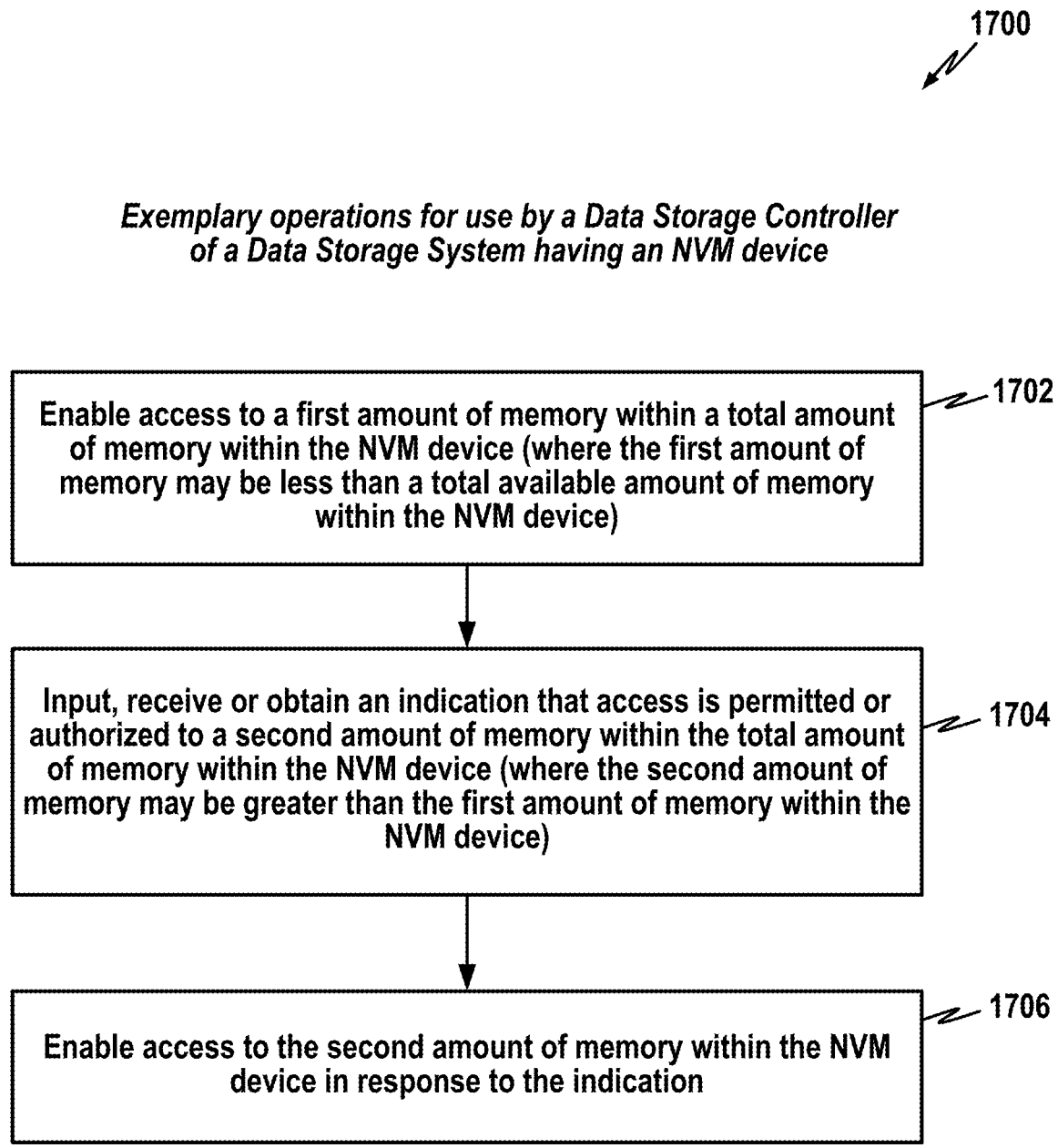
FIG. 17 is a flow chart summarizing selected operations of a data storage controller.

FIG. 17 broadly summarizes exemplary operations 1700 for use by or with a data storage system having a data storage controller or other suitable control device and an NVM storage device, such as a NAND. At 1702, the data storage controller enables access to a first amount of memory within the NVM device (where the first amount of memory may be less than a total available amount of memory within the NVM device). At 1704, the data storage controller inputs or obtains (or receives or fetches) an indication that access (e.g. user access) is permitted or authorized a second amount of memory within the total available amount of memory within the NVM device (where the second amount of memory may be greater than the first amount of memory within the NVM device). At 1706, the data storage controller enables access (e.g. user access) to the second amount of memory within the NVM device in response to the indication.

Figure 18:
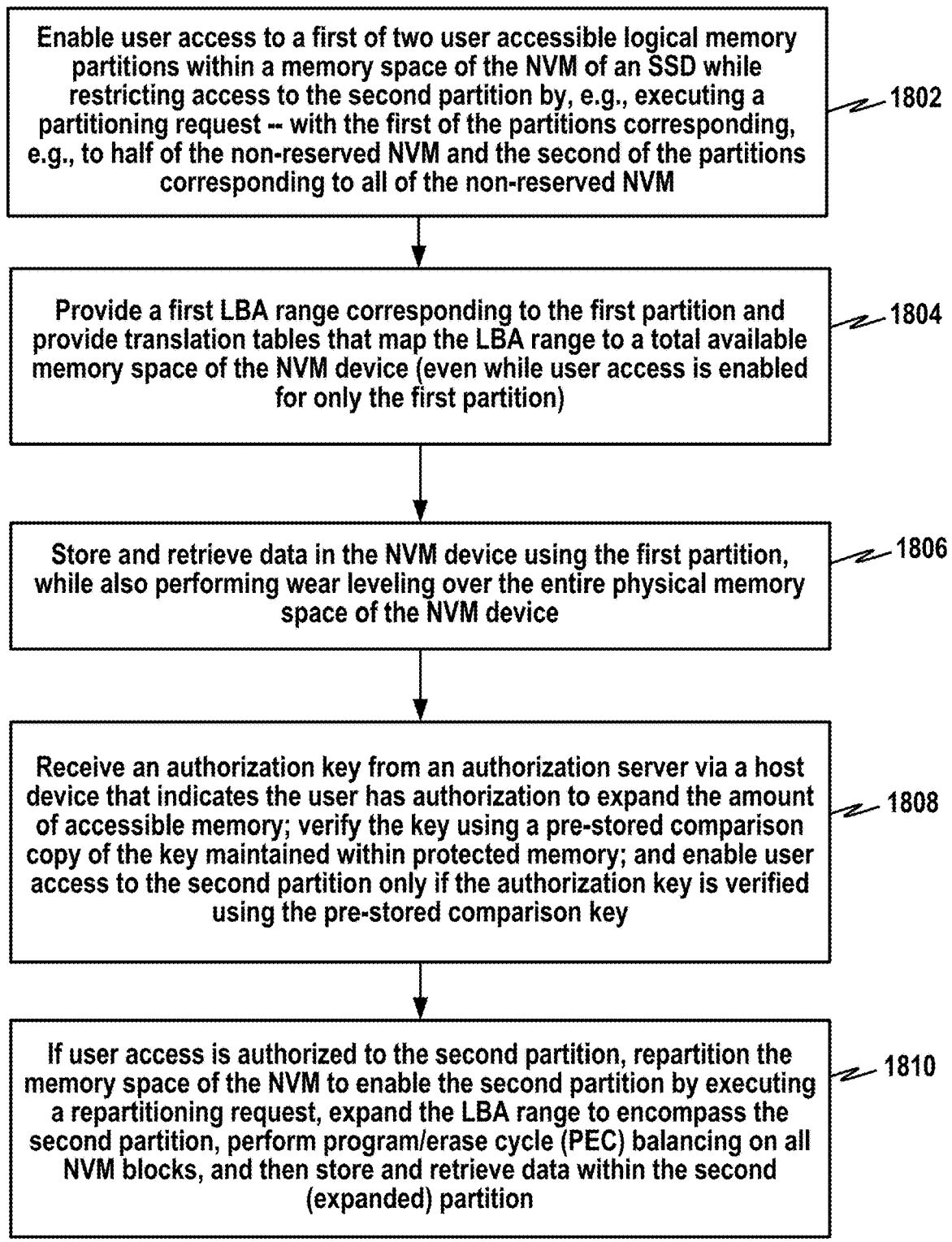
FIG. 18 summarizes further selected operations of a data storage controller.

FIG. 18 further summarizes exemplary operations 1800 for use by or with a data storage system having a data storage controller and an NVM. At 1802, the data storage controller enables user access to a first of two user accessible logical memory partitions within a memory space of the NVM while restricting access to the second partition by, e.g., executing a partitioning request—with the first of the partitions corresponding, e.g., to half of the non-reserved NVM and the second of the partitions corresponding to all of the non-reserved NVM. At 1804, the data storage controller provides a first LBA range corresponding to the first partition and provide translation tables that map the LBA range to a total available memory space of the NVM device (even while user access is enabled for only the first partition). At 1806, the data storage controller stores and retrieves data within the NVM using the first partition, while also performing wear leveling over the entire physical memory space of the NVM. At 1808, the data storage controller: (a) receives an authorization key from an authorization server via a host device that indicates the user has authorization to expand the amount of accessible memory; (b) verifies the key using a pre-stored comparison copy of the key maintained within a protected memory (such as ROM); and (c) enables user access to the second partition only if the authorization key is verified using the pre-stored comparison key. At 1810, if user access is authorized to the second partition, the data storage controller: repartitions the memory space of the NVM to enable the second partition by executing a repartitioning request; expands the LBA range to encompass the second partition; and performs PEC balancing on all NVM blocks, then stores and retrieves data within the second (expanded) partition.

In at least some examples, means may be provided for performing the functions illustrated in FIGS. 14-18 and/or other functions illustrated or described herein. For example, an apparatus (e.g. data storage controller 1600 of FIG. 16) may be provided for use in a data storage system (e.g. system 1601) that also includes an NVM data storage device (e.g. storage device 1602) where the apparatus includes: means (such as controller 1604) for enabling access to a first portion of memory within the NVM device, the first portion of memory less than a total available memory of the NVM device; means (such as controller 1608) for receiving an indication of authorization to expand access to include a second portion of memory within the NVM device; and means (such as controller 1612), operative in response to the indication of authorization, for expanding access to include the second portion of memory within the NVM device.

As further examples, the apparatus may include means (such as controller 1512 of FIG. 15) for enabling access to a first logical partition of a physical memory of the NVM device. The means for expanding access to include the second portion of memory may include means (such as controller 1524 of FIG. 15) for enabling access to a second logical partition of the physical memory of the NVM device. Means (such as wear leveling controller 1528) may be provided for wear levelling the NVM device that applies wearing levelling to a total amount of physical memory of the NVM device even if access is enabled only for the first portion of memory. Means (such as PEC controller 1530) may be provided for performing program erase cycle balancing on a total amount of physical memory of the NVM device when access is enabled to the second amount of memory within the NVM device.

As still further examples, the apparatus may include: means (such as controller 1406 of FIG. 14) for enabling access to a first amount of memory within the NVM device (where the first amount of memory may be less than a total available amount of memory within the NVM device); means (such as controller 1410 of FIG. 14) for authorizing access a second amount of memory within the NVM device based on an indication of authorization received from an external device; and means (such as controller 1414 of FIG. 14) for enabling access to the second amount of memory in response to the indication of authorization (where the second amount of memory may be larger than the first amount).

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIGS. 14-18 and/or other functions illustrated or described herein. For example, instructions may be provided for: enabling access to a first portion of memory within the NVM device, the first portion of memory less than a total available memory of the NVM device; receiving an indication of authorization to expand access to include a second portion of memory within the NVM device; and for expanding access to include the second portion of memory within the NVM device in response to the indication of authorization.

As further examples, instructions may be provided for enabling access to a first logical partition of a physical memory of the NVM device. The instructions for expanding access may include instructions for enabling access to a second logical partition of the physical memory of the NVM device. Instructions may be provided for wear levelling the NVM device that applies wearing levelling to a total amount of physical memory of the NVM device even if access is enabled only for the first portion of memory. Instructions may be provided for performing program erase cycle balancing on a total amount of physical memory of the NVM device when access is enabled to the second amount of memory within the NVM device. As still further examples, instructions may be provided for: enabling access to a first amount of memory within the NVM device (where the first amount of memory may be less than a total available amount of memory within the NVM device); authorizing access a second amount of memory within the NVM device based on an indication of authorization received from an external device; and for enabling access to the second amount of memory in response to the indication of authorization (where the second amount of memory may be larger than the first amount).

Additional Implementation Aspects and Configurations

The subject matter described herein can be implemented in any suitable NAND flash memory, including 2D or 3D NAND flash memory. Semiconductor memory devices include volatile memory devices, such as DRAM or static random access memory (SRAM) devices, non-volatile memory devices, such as resistive random access memory (ReRAM), electrically erasable programmable read only memory (EEPROM), flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:
1. A data storage device, comprising:
a non-volatile memory (NVM) device;
a memory access enablement controller configured to enable access to a first amount of memory within the NVM device;
an authorization controller configured to authorize access a second amount of memory within the NVM device based on an indication of authorization received from a host device;

a memory access adjustment controller configured to enable access to the second amount of memory in response to the indication of authorization;
a wear leveling controller configured to perform wear leveling operations on both the first and second amounts of memory while only the first amount of memory is enabled for access; and
a program erase cycle (PEC) balance controller configured to perform a PEC balancing operation on blocks within both the first and second amounts of memory in response to the indication of authorization.

2. The data storage device of claim 1,
wherein the memory access enablement controller is further configured to restrict access to a preselected amount of memory within the NVM device, and
wherein the second amount of memory comprises at least a portion of the preselected amount of memory.

3. The data storage device of claim 1,
wherein the second amount of memory is larger than the first amount of memory, and
wherein the memory access adjustment controller is further configured to expand the amount of memory that a user can access from the first amount to the second amount.

4. The data storage device of claim 1,
wherein the first amount of memory corresponds to a first logical partition of a physical memory of the NVM device, and
wherein the second amount of memory corresponds to a second logical partition of the physical memory of the NVM device.

5. The data storage device of claim 4,
wherein the physical memory further comprises a portion of reserved memory.

6. The data storage device of claim 1, wherein the memory access enablement controller, the authorization controller, and the memory access adjustment controller are front end (FE) components of a data storage controller.

7. The data storage device of claim 1, wherein the NVM device comprises a NAND storage device, and wherein the first and second amounts of memory comprise first and second NAND memory partitions, respectively.

8. The data storage device of claim 1,
wherein the indication of authorization includes an authorization key, and
wherein the authorization controller is further configured to verify authorization using a pre-stored comparison key.

9. The data storage device of claim 1, wherein the memory access adjustment controller is further configured to enable access to the second amount of memory by expanding a set of logical block addresses (LBA) to additionally include the second amount of memory.

10. A data storage device, comprising:
a non-volatile memory (NVM) device; and
a processing circuit configured to
enable access to a first amount of memory within the NVM device while restricting access to a second amount of memory,
perform wear leveling operations on both the first and second amounts of memory while only the first amount of memory is enabled for access,
authorize access to the second amount of memory within the NVM device based on an indication of authorization received from a host device,
enable access to the second amount of memory in response to the indication of authorization, and
perform a program erase cycle (PEC) balancing operation on blocks within both the first and second amounts of memory in response to the indication of authorization.

11. The data storage device of claim 10,
wherein the indication of authorization includes an authorization key, and
wherein the processing circuit is further configured to verify authorization using a pre-stored comparison key.

12. A system, comprising:
a host device;
an authorization server; and
a data storage device coupled to the host device, the data storage device including
a non-volatile memory (NVM) device,
a memory access enablement controller configured to enable access to a first amount of memory within the NVM device,
an authorization controller configured to authorize access a second amount of memory within the NVM device based on an indication of authorization received from the authorization server via the host device,
a memory access adjustment controller configured to enable access to the second amount of memory in response to the indication of authorization,
a wear leveling controller configured to perform wear leveling operations on both the first and second amounts of memory while only the first amount of memory is enabled for access, and
a program erase cycle (PEC) balance controller configured to perform a PEC balancing operation on blocks within both the first and second amounts of memory in response to the indication of authorization.

13. The system of claim 12, wherein the authorization server is further configured to:
receive a memory upgrade request from the host device;
generate the indication of authorization in response to the memory upgrade request; and
send the indication of authorization to the host device for forwarding to the authorization controller of the data storage device.

14. The system of claim 13, wherein the authorization server is further configured to:
receive a payment authorization from the host device; and
verify the payment authorization before generating the indication of authorization in response to the memory upgrade request.

15. The system of claim 12, wherein the authorization server is a centralized server.

16. The system of claim 12, wherein the data storage device is embedded in the host device.

17. A method for use by a data storage device having a data storage controller and a non-volatile memory (NVM) device, the method comprising:
enabling access to a first amount of memory within a total amount of memory within the NVM device;
perform wear leveling operations on both the first amount of memory and a second amount of memory within the NVM device while only the first amount of memory is enabled for access;
receiving an indication that access is permitted to a second amount of memory within the total amount of memory within the NVM device;

enabling access to the second amount of memory within the NVM device in response to the indication that access is permitted; and perform a program erase cycle (PEC) balancing operation on blocks within both the first and second amounts of memory in response to the indication that access is permitted.

18. The method of claim 17, wherein the second amount of memory is larger than the first amount of memory.

19. The method of claim 17,
wherein enabling access to the first amount of memory includes enabling access to a first logical partition of a physical memory of the NVM device, and
wherein enabling access to the second amount of memory includes enabling access to a second logical partition of the physical memory of the NVM device.

20. The method of claim 17,
wherein enabling access to the first amount of memory includes providing a first logical block addresses (LBA) range corresponding to the first amount of memory, and
wherein enabling access to the second amount of memory includes expanding the LBA range to additionally include the second amount of memory.

21. The method of claim 17,
wherein enabling access to the first amount of memory includes executing a partitioning request to enable a first partition within a memory space of the NVM device that corresponds to the first amount of memory, and
wherein enabling access to the second amount of memory includes executing a repartitioning request to the NVM device to repartition the memory space of the NVM device to include the first amount of memory and the second amount of memory.

22. The method of claim 17,
wherein receiving the indication includes receiving an authorization key from an authorization server via a host device coupled to the data storage device, and
wherein enabling access to the second amount of memory includes confirming authorization using a pre-stored comparison key.

23. The method of claim 17, wherein the NVM device comprises a NAND storage device, and wherein enabling access to the first and second amounts of memory includes enabling access to first and second NAND partitions, respectively.

24. The method of claim 17, wherein further comprising initially restricting access to a preselected amount of memory within the NVM device, wherein the second amount of memory comprises at least a portion of the preselected amount of memory.

25. A data storage device, comprising:
a non-volatile memory (NVM) device comprising first and second amounts of memory; and
a processing circuit configured to:
enable access to the first amount of memory,
perform wear leveling on both the first and second amounts of memory when only the first amount of memory is enabled for access,
receive an indication that access is permitted to the second amount of memory,
enable access to the second amount of memory within the NVM device in response to the indication that access is permitted, and
perform program erase cycle (PEC) balancing on blocks within both the first and second amounts of memory in response to the indication that access is permitted.

26. The data storage device of claim 25, wherein processing circuit is further configured to:
enable access to the first amount of memory by enabling access to a first logical partition of a physical memory of the NVM device; and
enable access to the second amount of memory by enabling access to a second logical partition of the physical memory of the NVM device.

27. The data storage device of claim 25, wherein processing circuit is further configured to:
enable access to the first amount of memory by executing a partitioning request to enable a first partition within a memory space of the NVM device that corresponds to the first amount of memory; and
enable access to the second amount of memory by executing a repartitioning request to the NVM device to repartition the memory space of the NVM device to include the first amount of memory and the second amount of memory.

28. The data storage device of claim 25,
wherein the indication that access is permitted includes an authorization key, and
wherein the processing circuit is further configured to verify authorization using a pre-stored comparison key.

29. The data storage device of claim 25, wherein the processing circuit is further configured to enable access to the second amount of memory by expanding a set of logical block addresses (LBA) to additionally include the second amount of memory.

30. The data storage device of claim 25, wherein the NVM device comprises a NAND storage device, and wherein enabling access to the first and second amounts of memory includes enabling access to first and second NAND partitions, respectively.

* * * * *